(12) United States Patent
Hirakawa et al.

(10) Patent No.: US 7,983,912 B2
(45) Date of Patent: Jul. 19, 2011

(54) APPARATUS, METHOD, AND COMPUTER PROGRAM PRODUCT FOR CORRECTING A MISRECOGNIZED UTTERANCE USING A WHOLE OR A PARTIAL RE-UTTERANCE

(75) Inventors: Hideki Hirakawa, Kanagawa (JP); Tetsuro Chino, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 944 days.

(21) Appl. No.: 11/374,976

(22) Filed: Mar. 15, 2006

(65) Prior Publication Data
US 2007/0073540 A1 Mar. 29, 2007

(30) Foreign Application Priority Data
Sep. 27, 2005 (JP) ................................ 2005-280593

(51) Int. Cl.
*G10L 15/00* (2006.01)
(52) U.S. Cl. .. 704/251; 704/231; 704/235; 704/E15.001
(58) Field of Classification Search .......................... None
See application file for complete search history.

(56) References Cited

U.S. PATENT DOCUMENTS

| | | | |
|---|---|---|---|
| 5,712,957 A * | 1/1998 | Waibel et al. | 704/240 |
| 5,829,000 A * | 10/1998 | Huang et al. | 704/252 |
| 5,864,805 A * | 1/1999 | Chen et al. | 704/235 |
| 5,970,451 A * | 10/1999 | Lewis et al. | 704/251 |
| 6,078,887 A * | 6/2000 | Gamm et al. | 704/275 |
| 6,327,566 B1 * | 12/2001 | Vanbuskirk et al. | 704/257 |
| 6,338,035 B1 | 1/2002 | Mori | |
| 6,374,214 B1 * | 4/2002 | Friedland et al. | 704/235 |
| 7,386,454 B2 * | 6/2008 | Gopinath et al. | 704/270 |
| 7,444,286 B2 * | 10/2008 | Roth et al. | 704/270 |
| 2003/0216912 A1 | 11/2003 | Chino | |

FOREIGN PATENT DOCUMENTS

JP 1-237597 9/1989
(Continued)

OTHER PUBLICATIONS

Kitaoka et al. "Detection and Recognition of Correction Utterances on Misrecognition of Spoken Dialog System". Systems and Computers in Japan, vol. 36 No. 11, 2005.*

(Continued)

*Primary Examiner* — Talivaldis Ivars Smits
*Assistant Examiner* — Jesse Scott Pullias
(74) *Attorney, Agent, or Firm* — Finnegan, Henderson, Farabow, Garrett & Dunner, L.L.P.

(57) ABSTRACT

A speech recognition apparatus includes a generation unit generating a recognition candidate associated with a speech utterance and a likelihood; a storing unit storing the one recognition; a selecting unit selecting the recognition candidate as a recognition result of a first speech utterance; an utterance relation determining unit determining whether a second speech utterance which is input after the input of the first speech utterance is a speech re-utterance of a whole of the first speech utterance or a speech re-utterance of a part of the first speech utterance; a whole correcting unit correcting the recognition candidate of the whole of the first speech utterance when the second speech utterance is the whole of the first speech utterance; and a part correcting unit correcting the recognition candidate for the part of the first speech utterance when the second speech utterance is the part of the first speech utterance.

13 Claims, 16 Drawing Sheets

FOREIGN PATENT DOCUMENTS

| | | |
|---|---|---|
| JP | 7-248792 | 9/1995 |
| JP | 10-039892 | 2/1998 |
| JP | 11-149294 | 6/1999 |
| JP | 11-194793 | 7/1999 |
| JP | 2002-287792 | 10/2002 |
| JP | 2003-316386 | 11/2003 |

OTHER PUBLICATIONS

Notice of Rejection issued by the Japanese Patent Office on Oct. 27, 2009, for Japanese Patent Application No. 2005-280593, and English-language translation thereof.

* cited by examiner

FIG.3

| | |
|---|---|
| 私は公演に生きたい | ～ 301 |
| 公演 | ～ 302 |
| 公園 | ～ 303 |
| 後援 | ～ 304 |
| 好演 | ～ 305 |
| 私は公園に生きたい | ～ 306 |
| 生き | ～ 307 |
| 私は公園に行きたい | ～ 308 |
| 名画生みたいのですがどこへ行けばよいですか | ～ 309 |
| 映画を見たいのですがどこへ行けばよいですか | ～ 310 |
| 名画 | ～ 311 |
| 映画 | ～ 312 |
| ムービー | ～ 313 |
| ジェット機 | ～ 314 |
| 飛行機 | ～ 315 |
| マービー | ～ 316 |
| 名画生みたいのですが | ～ 317 |

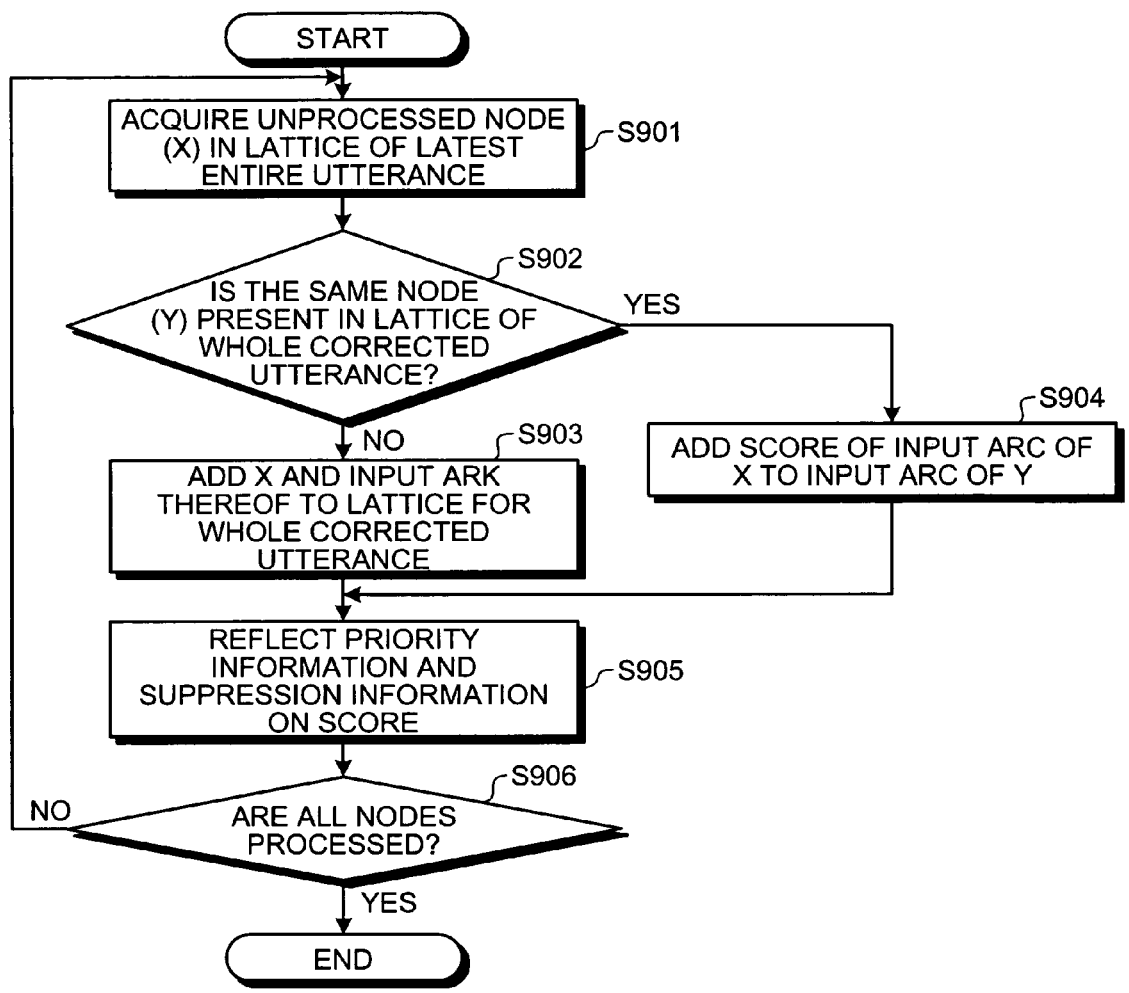

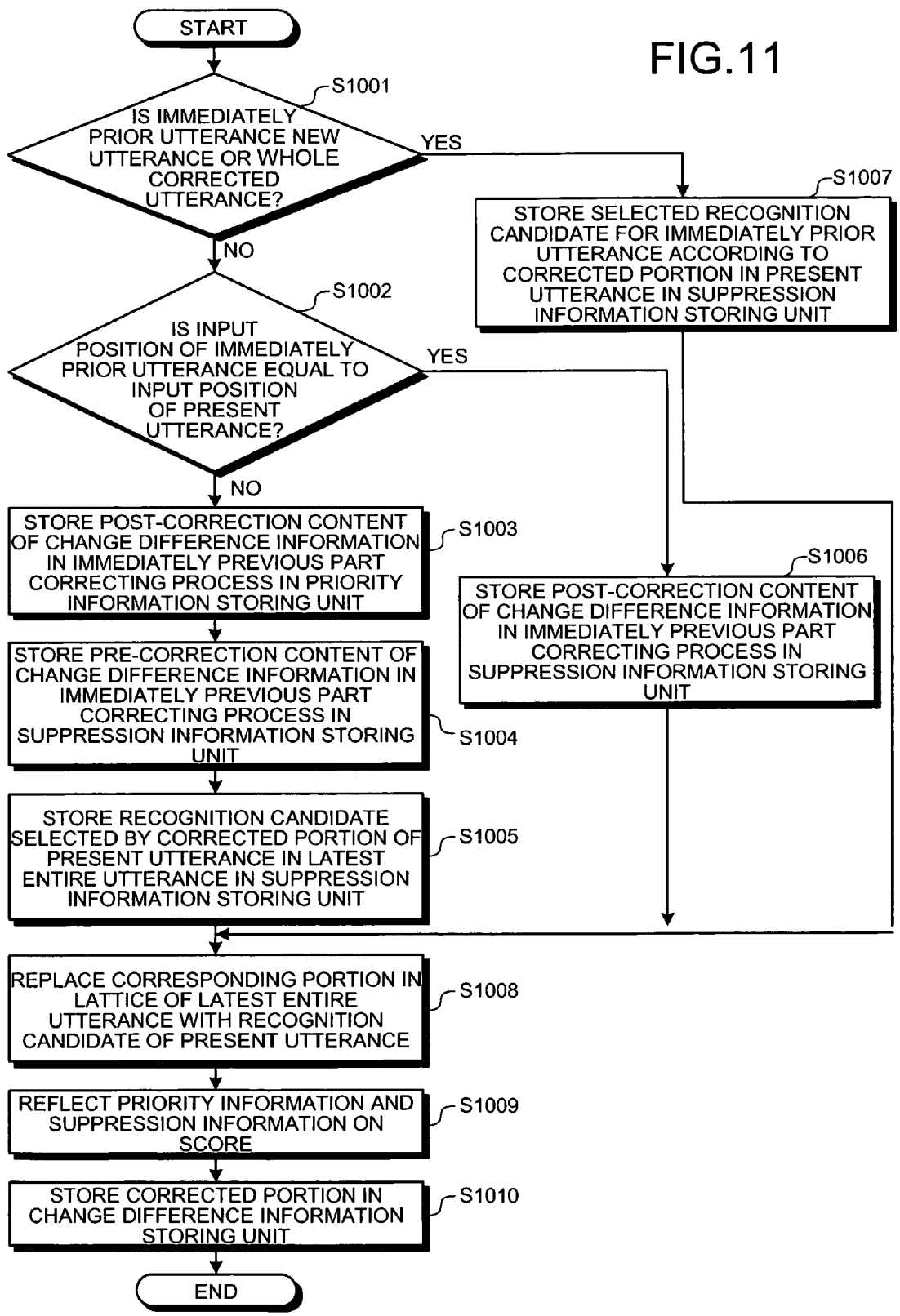

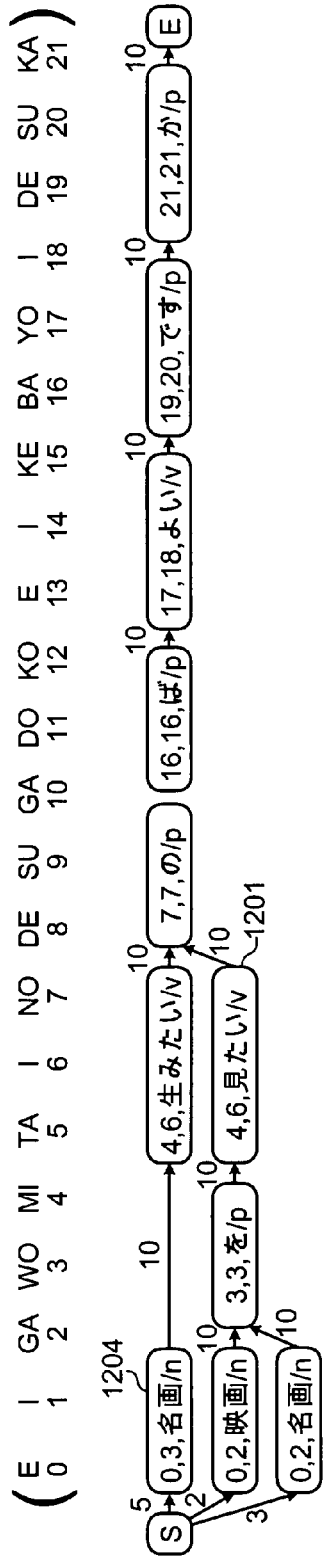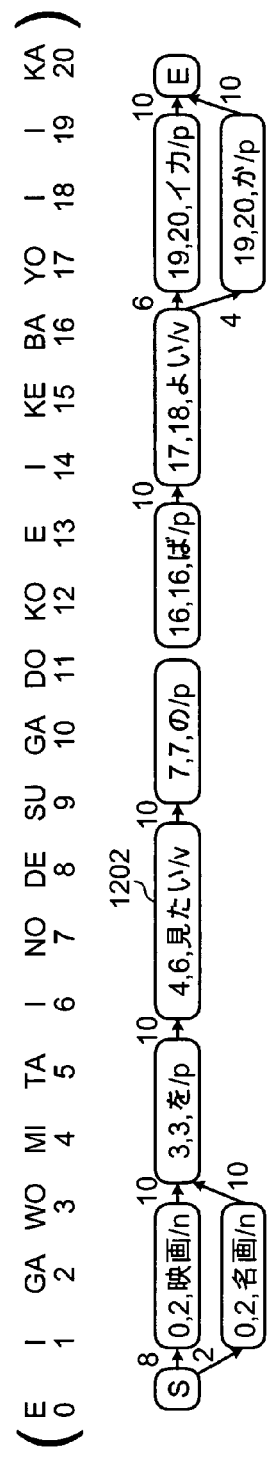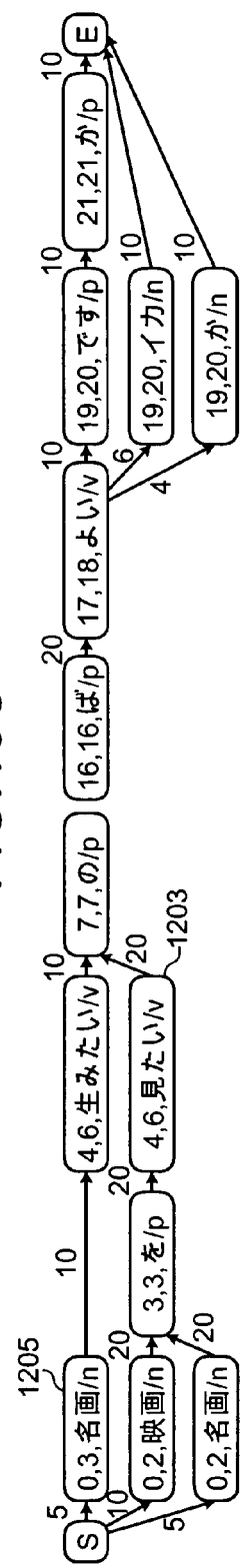

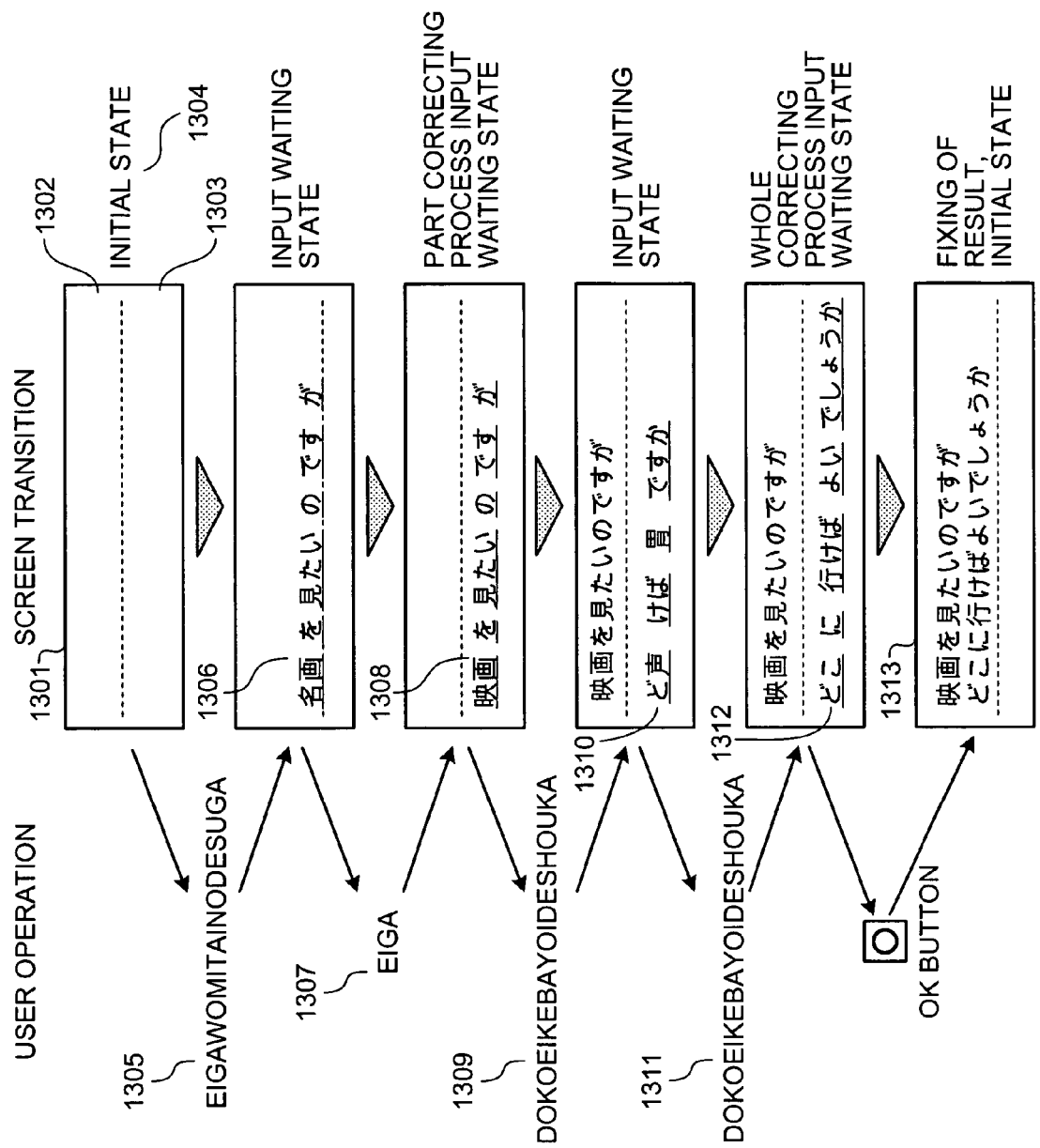

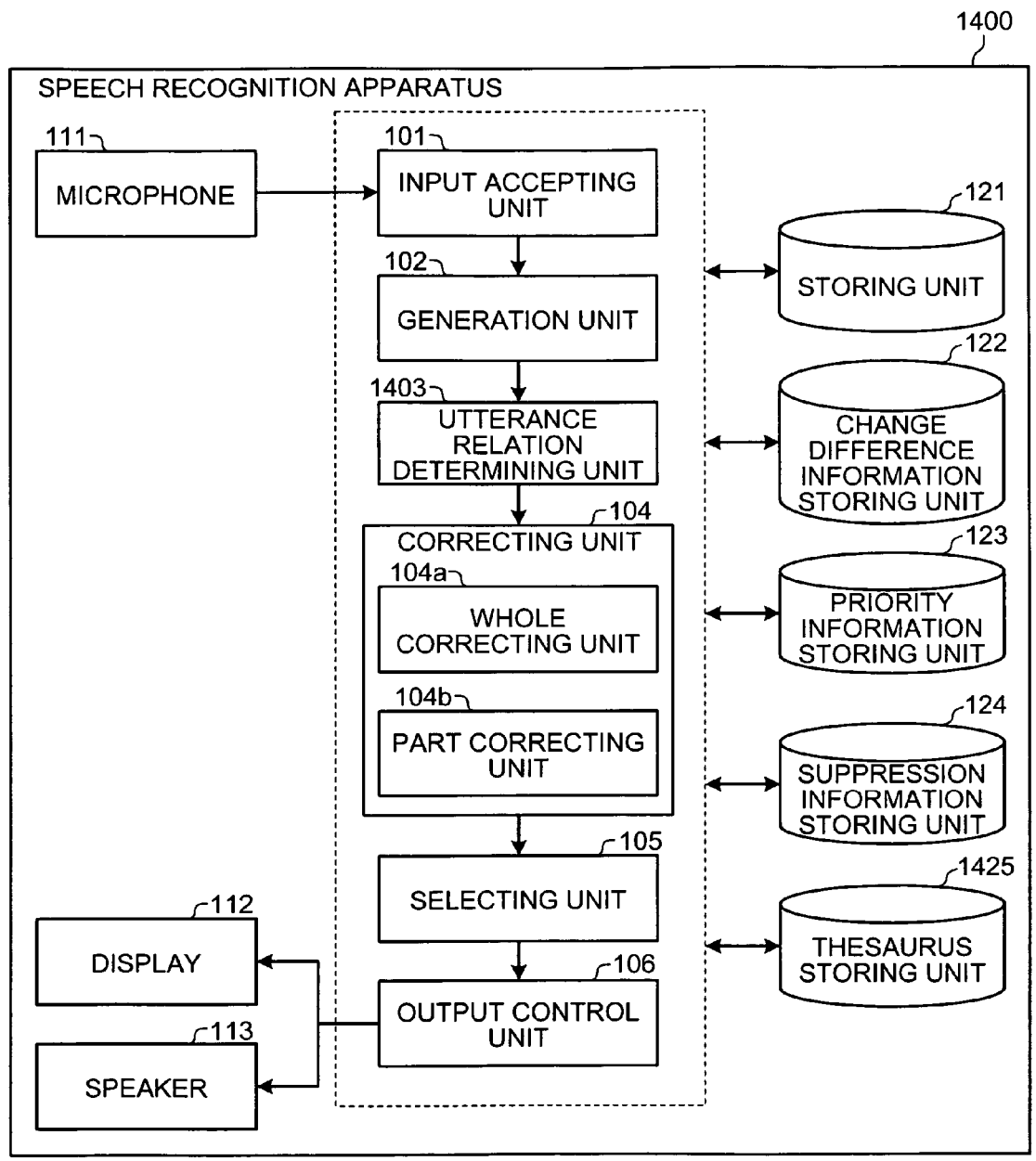

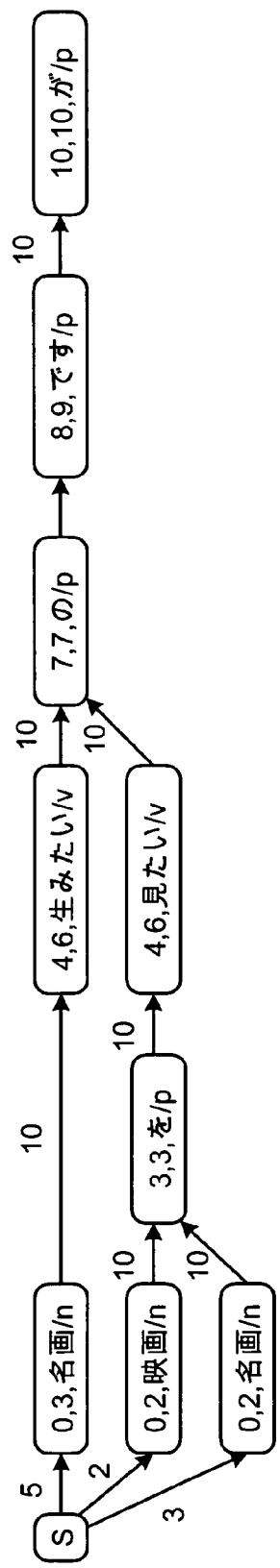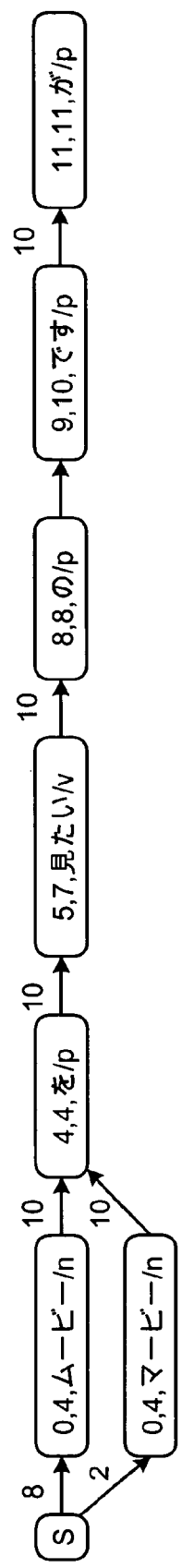

APPARATUS, METHOD, AND COMPUTER PROGRAM PRODUCT FOR CORRECTING A MISRECOGNIZED UTTERANCE USING A WHOLE OR A PARTIAL RE-UTTERANCE

CROSS-REFERENCE TO RELATED APPLICATIONS

This application is based upon and claims the benefit of priority from the prior Japanese Patent Application No. 2005-280593, filed on Sep. 27, 2005; the entire contents of which are incorporated herein by reference.

BACKGROUND OF THE INVENTION

1. Field of the Invention

The present invention relates to a speech recognition apparatus, a method of speech recognition, and a computer program product for speech recognition, according to which a character string in speech input is recognized.

2. Description of the Related Art

Conventionally, techniques for speech recognition are developed to realize conversion of speech information into textual information through pattern collation between a speech utterance and previously stored information on speech analysis. The currently available speech recognition techniques are not completely immune to errors in recognition. To offset this inconvenience, various techniques are proposed and widely utilized to enhance precision of speech recognition.

One conventional technique, for example, enables an efficient acquisition of appropriate results in speech recognition by; selecting a most likely recognition candidate among plural recognition candidates and presenting the same to the user, allowing the user to re-input an entire utterance if the selected recognition candidate is not correct, and excluding the rejected recognition candidate from further presentation. Such technique, however, increases the operational load for the user because it requires the re-input of the whole utterance.

On the other hand, Japanese Patent Application Laid-open (JP-A) No. 2002-287792 discloses a technique, according to which when the selected recognition candidate is wrong, only a portion that is not properly recognized is re-input by the user. Then the recognition candidate is corrected based on the re-input utterance and the corrected candidate is shown to the user again. According to this technique, since the user does not need to re-utter the entire sentence, the load on the user can be alleviated and the operability of the apparatus increases.

In JP-A No. 2002-287792, the supplied information is assumed to have a hierarchical structure as in addresses or telephone numbers. At the correction of the recognition candidate, the level of the re-input utterance in the hierarchy is determined, and the correction is carried out based on the determination. Here, only the patterns of the level of the erroneously recognized candidate may be selected as the targets of collation. Hence, a more efficient and highly precise recognition process can be realized.

Further, JP-A No. 2003-316386 proposes a technique to allow for the user to re-input the utterance which corresponds only to the erroneously recognized portion, and to delete the recognition candidate selected at the previous utterance from the recognition candidates for the re-input, thereby avoiding selecting and presenting the same erroneous candidate to the user.

In general, in a speech recognition system which receives and recognizes a phrase or a sentence, the erroneous recognition may occur in two patterns: firstly, only some words may be erroneously recognized; secondly, a burst error may occur, i.e., a whole utterance may be erroneously recognized due to an influence of noise or the like. When erroneously recognized portions are small in number and the error is minor, it is efficient that only the pertinent portions are corrected. On the other hand, when portions to be corrected are large in number, as in the case of the burst error, it is efficient that the entire utterance is corrected.

The conventional techniques, however, basically realizes only one of the two types of the error correction in speech recognition, i.e., the re-input for the correction of the whole uttered sentence, or the re-input for the correction of a part of the utterance. Thus, the manner of correction cannot be flexibly selected according to the type of the error at the recognition.

Meanwhile, the technique disclosed in the JP-A No. 2003-316386 can be applied to both the entire correction and the partial correction. However, this technique allows for only one manner of correction for each of the entire correction and the partial correction, and hence the correction cannot be performed flexibly according to the manner of re-input by the user, i.e., whether the user re-inputs the whole utterance or a part of the utterance.

SUMMARY OF THE INVENTION

According to one aspect of the present invention, a speech recognition apparatus includes a generation unit configured to receive a speech utterance and to generate at least one recognition candidate associating to the speech utterance and a likelihood of the recognition candidate; a storing unit configured to store at least the one recognition candidate and the likelihood; a selecting unit configured to select one of at least the one recognition candidate as a recognition result of a first speech utterance based on the likelihood; an utterance relation determining unit configured to determine, when a first speech utterance and a second speech utterance are sequentially input, at least whether the second speech utterance which is input after the input of the first speech utterance is a speech re-utterance of a whole of the first speech utterance or a speech re-utterance of a part of the first speech utterance; a whole correcting unit configured to correct the recognition candidate of the whole of the first speech utterance based on the second speech utterance and to display the corrected recognition result when the utterance relation determining unit determines that the second speech utterance is the speech re-utterance of the whole of the first speech utterance; and a part correcting unit configured to correct the recognition candidate for the part of the first speech utterance, the part corresponding to the second speech utterance, based on the second speech utterance and to display the corrected recognition result when the utterance relation determining unit determines that the second speech utterance is the speech re-utterance of the part of the first speech utterance.

According to another aspect of the present invention, a method of speech recognition includes receiving a speech utterance; generating at least one recognition candidate associating to the speech utterance and a likelihood of the recognition candidate; selecting one of at least the one recognition candidate as a recognition result of a first speech utterance based on the likelihood; determining, when a first speech utterance and a second speech utterance are sequentially input, at least whether the second speech utterance which is input after the input of the first speech utterance is a speech re-utterance of a whole of the first speech utterance or a speech re-utterance of a part of the first speech utterance; correcting the recognition candidate of the whole of the first speech utterance based on the second speech utterance to display the corrected recognition result, when the utterance relation determining unit determines that the second speech utterance is the speech re-utterance of the whole of the first speech utterance; and correcting the recognition candidate for the part of the first speech utterance, the part corresponding to the second speech utterance, based on the second speech utterance to display the corrected recognition result, when the second speech utterance is determined to be the speech re-utterance of the part of the first speech utterance.

A computer program product according to still another aspect of the present invention causes a computer to perform the method according to the present invention.

BRIEF DESCRIPTION OF THE DRAWINGS

FIG. 3 shows an example of data processed by the speech recognition apparatus according to the first embodiment;

FIG. 10 is a flowchart of an entire flow of an entirely corrected candidate generating process according to the first embodiment;

FIG. 11 is a flowchart of an entire flow of a part correcting process according to the first embodiment;

FIGS. 13A to 13C show another example of data processed by the speech recognition process;

FIG. 14 shows an example of an operation screen displayed in the speech recognition process;

FIG. 15 is a block diagram of a configuration of a speech recognition apparatus according to a second embodiment;

FIG. 16 shows an example of a data structure of a thesaurus stored in a thesaurus storing unit;

FIGS. 19A and 19B show examples of data processed by the speech recognition process.

DETAILED DESCRIPTION OF THE INVENTION

Preferred embodiments of a speech recognition apparatus, a method of speech recognition, and a computer program product for speech recognition according to the present invention will be described below in detail with reference to the accompanying drawings.

A speech recognition apparatus according to a first embodiment determines whether a speech which is re-input by the user is a speech for the entire correction or a speech for the partial correction, and changes a correcting manner according to the result of determination. The speech recognition apparatus of the first embodiment further selects and outputs a most probable recognition candidate from among recognition candidates that are integration of recognition candidates for an original speech and recognition candidates for a re-input speech for correction.

Figure 1:
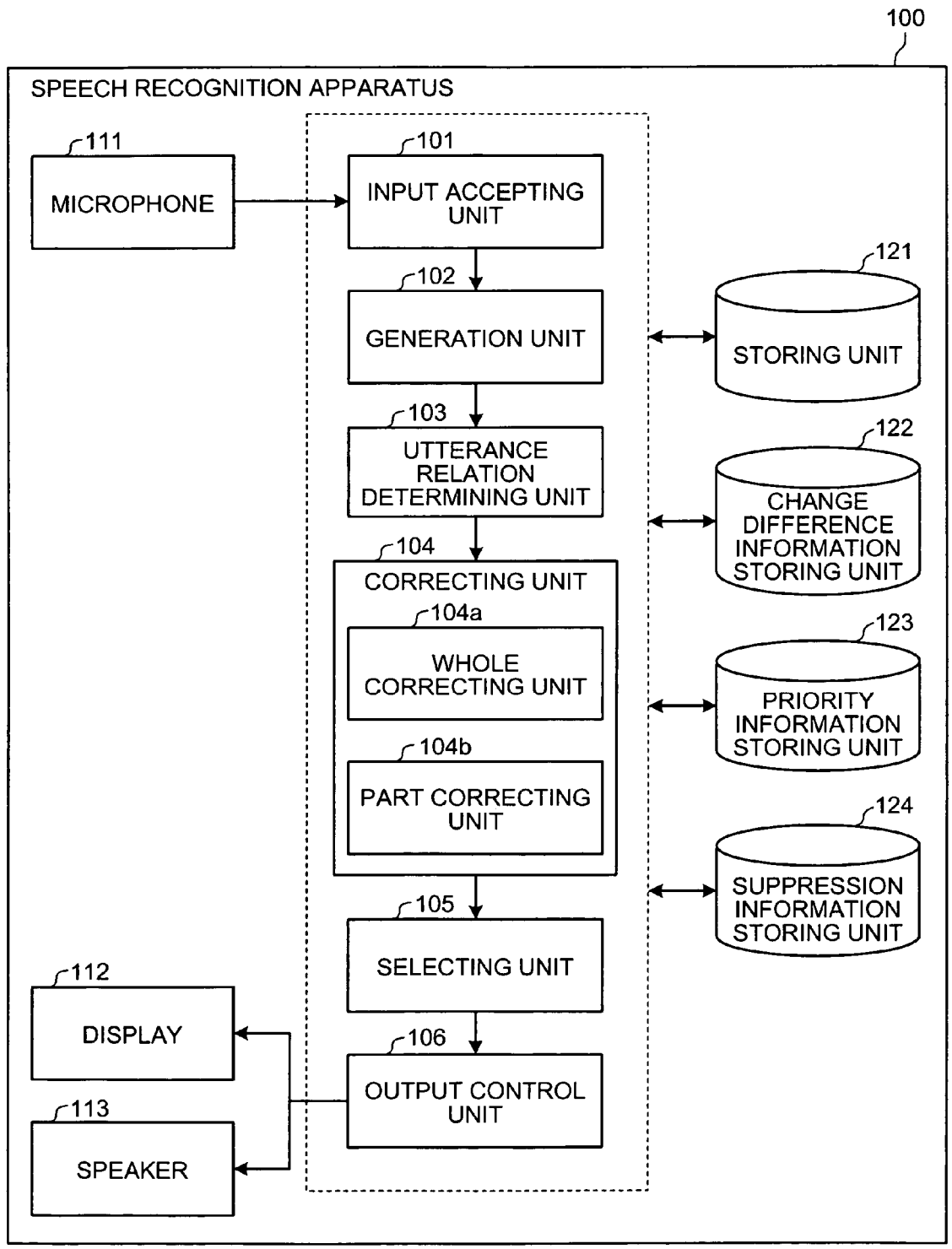
FIG. 1 is a block diagram of a configuration of a speech recognition apparatus according to a first embodiment.

FIG. 1 is a block diagram of the configuration of a speech recognition apparatus 100 according to the first embodiment. As shown in FIG. 1, the speech recognition apparatus 100 includes, as a main hardware configuration, a microphone 111, a display 112, a speaker 113, a storing unit 121, a change difference information storing unit 122, a priority information storing unit 123, and a suppression information storing unit 124.

The speech recognition apparatus 100 includes, as a main software configuration, an input accepting unit 101, a generation unit 102, an utterance relation determining unit 103, a correcting unit 104, a selecting unit 105, and an output control unit 106.

The microphone 111 is an input device through which a user inputs a speech (i.e., utterance). The display 112 is a display unit which displays a screen to present a recognition result or the like to the user. The speaker 113 outputs a synthetic sound obtained as a synthesis of speech corresponding to a recognition candidate which is determined to be a correct recognition candidate. When the speech recognition apparatus of the first embodiment is applied to a voice translation system, the speaker 113 outputs a synthetic sound obtained as a synthesis of speech in a target language.

Figures 2A, 2B:
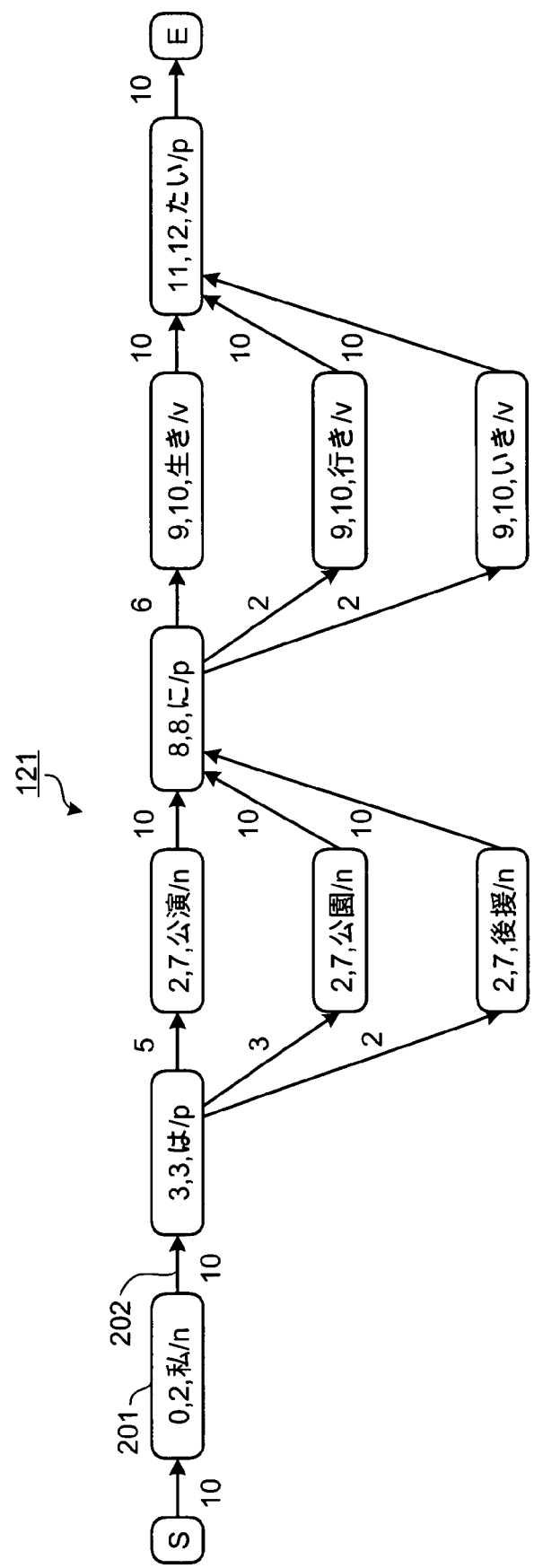
FIGS. 2A and 2B show an example of a data structure of a recognition candidate stored in a storing unit.

The storing unit 121 serves to store a recognition candidate which is generated by the generation unit 102 described later and is provided as a result of speech recognition. FIGS. 2A and 2B show an example of a data structure of the recognition candidate stored in the storing unit 121.

As shown in FIGS. 2A and 2B, the storing unit 121 stores a result of the speech recognition in a lattice format. FIG. 2A schematically shows phonemes included in an input speech and numerical values expressing input positions of the phonemes in correspondence with each other. The input position may be represented by any other information as far as the information can specifies the input position.

In the lattice format, nodes representing the results of recognition are arranged in the direction from the left to the right in time-series and connected with each other by arcs. The result of recognition is collated with a speech analysis pattern stored in a speech recognition dictionary (not shown) and a degree of similarity therebetween is represented by a score. The score is affixed to the arc in the lattice. In particular, the score of a node is affixed to an arc coming into the node (hereinafter referred to as an input arc). For example, in the example shown in FIG. 2, a score is written under an arrow representing an arc 202. The score, in brief, indicates the likelihood of the recognition candidate.

A node is generated for each predetermined segment of input voice, such as a character-string like a word, a phonemic string like an accent phrase, a phoneme, and a syllable. For example, a node 201 in FIG. 2B represents a Japanese word consisting of three phonemes, i.e., "WA", "TA", and "SHI" spoken in a segment from an input position 0 to an input position 2. A part following a symbol "/" represents a word class of the word. For example, "/n" in the node 201 represents that the word class of the pertinent word is a noun.

When there is plural recognition candidates, plural nodes are generated correspondingly. A recognition candidate corresponding to a node having the highest score among the plural nodes is selected and output as the most likely candidate.

The storing unit 121 stores not only a recognition result for a latest utterance but also a recognition result for a past utterance so that the utterance relation determining unit 103 described later can refer to the storing unit 121 for determining a relation between the latest utterance and the past utterance.

In addition, the storing unit 121 stores identification information in association with the recognition results to indicate the time of an utterance to which the recognition result corresponds. Such identification information indicates at least whether the corresponding sound belongs to a first utterance, a present utterance, an immediately prior utterance, or a latest entire utterance.

Here, the first utterance is an utterance input when the speech recognition apparatus 100 is ready to receive a new utterance. The present utterance is the latest utterance the speech recognition apparatus 100 receives. The immediately prior utterance is an utterance input immediately before the present utterance. The latest entire utterance is the latest utterance among all entire utterances except for the present utterance, which is input to correct the first utterance.

Further, the storing unit 121 stores information to indicate whether an utterance is a new utterance, a whole corrected utterance, or a part corrected utterance. In this case, the new utterance is a newly input utterance, the whole corrected utterance is a re-utterance of the whole of the immediately prior utterance, and the part corrected utterance is a re-utterance of a part of the immediately prior utterance. The type of the utterance, i.e., whether the utterance is the new utterance, the whole corrected utterance, or the part corrected utterance, is determined by the utterance relation determining unit 103 described later and stored in the storing unit 121.

FIG. 3 shows an example of data processed by the speech recognition apparatus according to the first embodiment. A Japanese sentence 301, for example, in FIG. 3 represents a selected recognition candidate which has the highest score in the lattice shown in FIG. 2B. Further, Japanese words 302 to 305 in FIG. 3 represent four Japanese words each pronounced as "KO-U-E-N".

Figure 4:
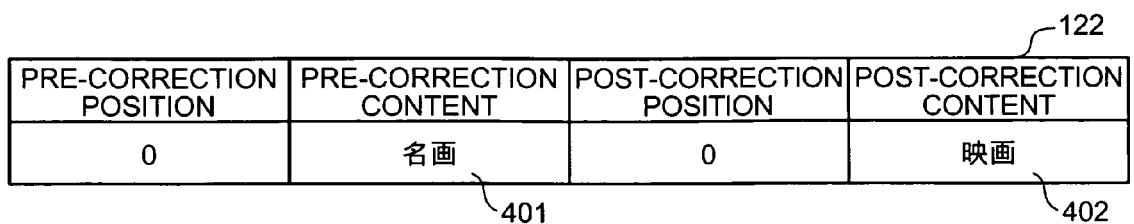
FIG. 4 shows an example of a data structure of correction content stored in a change difference information storing unit.

The change difference information storing unit 122 serves to store correction content obtained when the correcting unit 104 corrects a recognition candidate. FIG. 4 shows an example of a data structure of the correction content stored in the change difference information storing unit 122.

As shown in FIG. 4, the change difference information storing unit 122 stores a pre-correction position, a pre-correction content, a post-correction position, and a post-correction content in association with each other.

The pre-correction position is information representing an input position of a corrected portion in an utterance before correction. The pre-correction content is information representing content before correction of the corrected portion. The post-correction position is information representing an input position of the corrected portion in an utterance after correction. The post-correction content is information representing content after correction of the correction portion.

In the example shown in FIG. 4, correction content indicates that a Japanese word 401 at an input position 0 in a past utterance is corrected into a Japanese word 402 at an input position 0 in a re-input utterance for correction.

The change difference information storing unit 122 is referred to when the correcting unit 104 updates the score of a recognition candidate with reference to past correction content.

Figure 5:
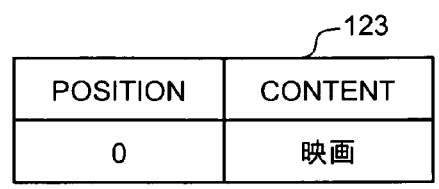
FIG. 5 shows an example of a data structure of priority information stored in a priority information storing unit.

The priority information storing unit 123 serves to store priority information which is information on a recognition candidate which is determined to be prioritized by the correcting unit 104 with reference to the past correction content. FIG. 5 shows an example of a data structure of the priority information stored in the priority information storing unit 123.

As shown in FIG. 5, the priority information storing unit 123 stores a position representing an input position of a prioritized portion in the past utterance and content of the prioritized portion in association with each other.

For example, when a certain portion and another portion are sequentially corrected, a corrected content of the first corrected portion is stored in the priority information storing unit 123. Since the first corrected portion is not re-corrected, it can be determined that the content of the first corrected portion is correctly recognized. Then the content after the first correction should be prioritized in the selection of the recognition candidate.

Figure 6:
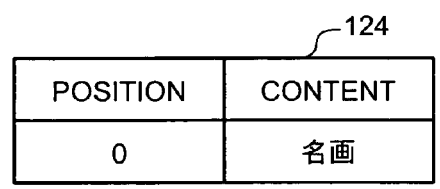
FIG. 6 shows an example of a data structure of suppression information stored in a suppression information storing unit.

The suppression information storing unit 124 serves to store suppression information which is information on a recognition candidate which is determined not to be prioritized by the correcting unit 104 with reference to the past correction content. FIG. 6 shows an example of a data structure of the suppression information stored in the suppression information storing unit 124.

As shown in FIG. 6, the suppression information storing unit 124 stores a position representing an input position of a portion to be suppressed in a past utterance and content of the portion to be suppressed in association with each other.

For example, when a certain portion is corrected and the same portion is sequentially corrected again, a corrected content after the first correction is stored in the suppression information storing unit 124. Since the portion is corrected again after the first correction, it can be determined that the content of the first correction is erroneous. Then, the content after the first correction should be suppressed in the selection of a recognition candidate.

The storing unit 121, the change difference information storing unit 122, the priority information storing unit 123, and the suppression information storing unit 124 can be formed from any popularly used storage devices such as a Hard Disk Drive (HDD), an optical disk, a memory card, and a Random Access Memory (RAM).

The input accepting unit 101 serves to receive a speech input by the user through the microphone 111 and to convert the received speech into an electric signal which can be processed by the generation unit 102 to output the electric signal. More specifically, the input accepting unit 101 takes in the speech, converts the speech into the electric signal, performs an analog-digital (A/D) conversion, and output digital data obtained via the conversion in a pulse code modulation (PCM) format or the like. These processes can be realized in the same manner as that of a conventionally used digitizing process of an audio signal.

The output digital data is stored in a storing unit (not shown), and is referred to when the generation unit 102 described later executes a speech recognition process.

When the speech recognition apparatus 100 has input units (not shown) such as an operation button or a keyboard other than the microphone 111, the input accepting unit 101 receives information supplied from these input units via pushdown of the button, for example.

The generation unit 102 receives digital data supplied from the input accepting unit 101, performs the speech recognition process, and generates a recognition candidate as a result of the speech recognition process.

More specifically, the generation unit 102 performs frequency analysis or the like by FFT (Fast Fourier transformation) or the like to time-serially output feature information (spectrum, for example) required for the speech recognition of each predetermined segment of the speech input. The predetermined segment is a unit such as a character string such as a word, a phoneme string such as an accent phrase, a phoneme, or a syllable. The process can be realized by a conventional speech analysis processing technique.

Further, the generation unit 102 collates the feature information and a speech analysis pattern stored in the speech recognition dictionary (not shown) to calculate the score representing the degree of similarity therebetween, and outputs a recognition candidate in the lattice form described above. As the collating process, any generally used methods such as a Hidden Markov Model (HMM), Dynamic Programming (DP), or a Neural Network (NN) can be applied.

The utterance relation determining unit 103 serves to determine whether a present utterance input by the user is a re-utterance of the whole of the immediately prior utterance or a re-utterance of a part of the immediately prior utterance.

More specifically, the utterance relation determining unit 103 compares pieces of speech information of two utterances with each other to detect a similar portion where the degree of similarity between the pieces of speech information is higher than a predetermined threshold value. When the similar portion matches with the whole of the immediately prior utterance, the utterance relation determining unit 103 determines that the present utterance is the whole corrected utterance.

Even when the user intends to give the present utterance with the same content as the immediately prior utterance, the user might give an utterance with a different termination. Then, the similar portion may not be completely the same between the two utterances. Therefore, in not only a case in which the similar portion is completely matched with the entire speech but also a case in which the similar portion is partially matched with the entire speech at a predetermined percentage (for example 85%) or more, the present utterance may be determined to be the whole corrected utterance.

When the similar portion is matched with a part of the immediately prior utterance, and when the similar portion is matched with the whole of the present utterance, the utterance relation determining unit 103 determines that the present utterance is the part corrected utterance. When the present utterance is not the whole corrected utterance or the part corrected utterance, the utterance relation determining unit 103 determines that the present utterance is the new utterance.

For example, assume that the immediately prior utterance is a Japanese sentence which means "Where should I go to see the movie?" and which is pronounced as "E-I-GA-WO-MI-TA-I-NO-DE-SU-GA-DO-KO-E-I-KE-BA-YO-I-DE-SU-KA," and that the present utterance is a Japanese word which means a movie and which is pronounced as "E-I-GA". In this case, a node corresponding to "E-I-GA" is present in a lattice which is recognition information of the immediately prior utterance, and a node corresponding to "E-I-GA" is present in the lattice of the present utterance. Then, the pertinent node is recognized as a similar portion, and the present utterance is determined to be the part corrected utterance of the immediately prior utterance. Further, assume that the present utterance is "EI-GA-WO-MI-TA-I-NO-DE-SU-GA-DO-KO-E-I-KE-BA-YO-I-DE-SU". In this case, the present utterance is different from the immediately prior utterance in a portion "KA" which is the phoneme of the end of the sentence. However, since the ratio of the matched portion is high, the present utterance is determined to be the whole corrected utterance.

The utterance relation determining unit 103 also has a function of determining an operation state of the speech recognition apparatus 100. For example, when the operation of the speech recognition apparatus 100 starts or when the input accepting unit 101 receives an instruction from the user, the utterance relation determining unit 103 determines that the speech recognition apparatus 100 is in an initial state in which an input of a new utterance is accepted.

When the speech recognition apparatus 100 is in the initial state, none of the first utterance, the present utterance, the immediately prior utterance, and the latest entire utterance is stored in the storing unit 121. An utterance the speech recognition apparatus 100 receives for the first time during the initial state is the first utterance. When the speech recognition apparatus 100 receives the first utterance, the utterance relation determining unit 103 determines that the speech recognition apparatus 100 transits to a correction waiting state.

When the speech recognition apparatus 100 receives an utterance via voice in the correction waiting state, the utterance relation determining unit 103 performs a process to determine whether the present utterance is the new utterance, the whole corrected utterance, or the part corrected utterance, based on the relation between the present utterance and the immediately prior utterance as described above. When the utterance relation determining unit 103 determines that the present utterance is the new utterance, the process is performed in the same manner as when the utterance is input in the initial state. In this case, the utterance relation determining unit 103 deletes all the first utterance, the present utterance, the immediately prior utterance, and the latest entire utterance which are stored in the storing unit 121 heretofor and newly stores the new utterance.

When the utterance relation determining unit 103 determines that the present utterance is the whole corrected utterance or the part corrected utterance, the correcting unit 104 performs a correcting process to correct the recognition candidate and output the corrected recognition candidate. The correcting unit 104 includes a whole correcting unit 104a and a part correcting unit 104b.

When the utterance relation determining unit 103 determines that the present utterance is the whole corrected utterance, the whole correcting unit 104a corrects a recognition candidate for the latest entire utterance with reference to the recognition candidate of the present utterance and outputs the corrected recognition candidate to the storing unit 121.

When the utterance relation determining unit 103 determines that the present utterance is the part corrected utterance, the part correcting unit 104b corrects a recognition candidate corresponding to a part to be corrected in the latest entire utterance with reference to the recognition candidate of the present utterance and outputs the corrected recognition candidate to the storing unit 121.

The selecting unit 105 serves to select a recognition candidate having a maximum score in the lattice from the recognition candidates stored in the storing unit 121. As a selecting method, any methods such as a Viterbi algorithm which is generally used can be applied.

The output control unit 106 serves to output the recognition candidate selected by the selecting unit 105 to the display 112. When the user indicates that the recognition candidate output to the display 112 is a correct recognition result, the output control unit 106 outputs a synthetic sound, which is a synthesis of speech representing a sentence corresponding to the recognition candidate, to the speaker 113.

As a speech synthesizing process, any generally used methods such as a text-to-speech system using concatenative synthesis based on phoneme segments, formant synthesis or the like can be applied.

When the speech recognition apparatus of the embodiment is structured as a voice translating system, the output control unit 106 may translate a sentence corresponding to a recognition candidate in an original language into a sentence in a target language, and a synthetic sound corresponding to the translated sentence in the target language may be output to the speaker 113.

Figure 7:
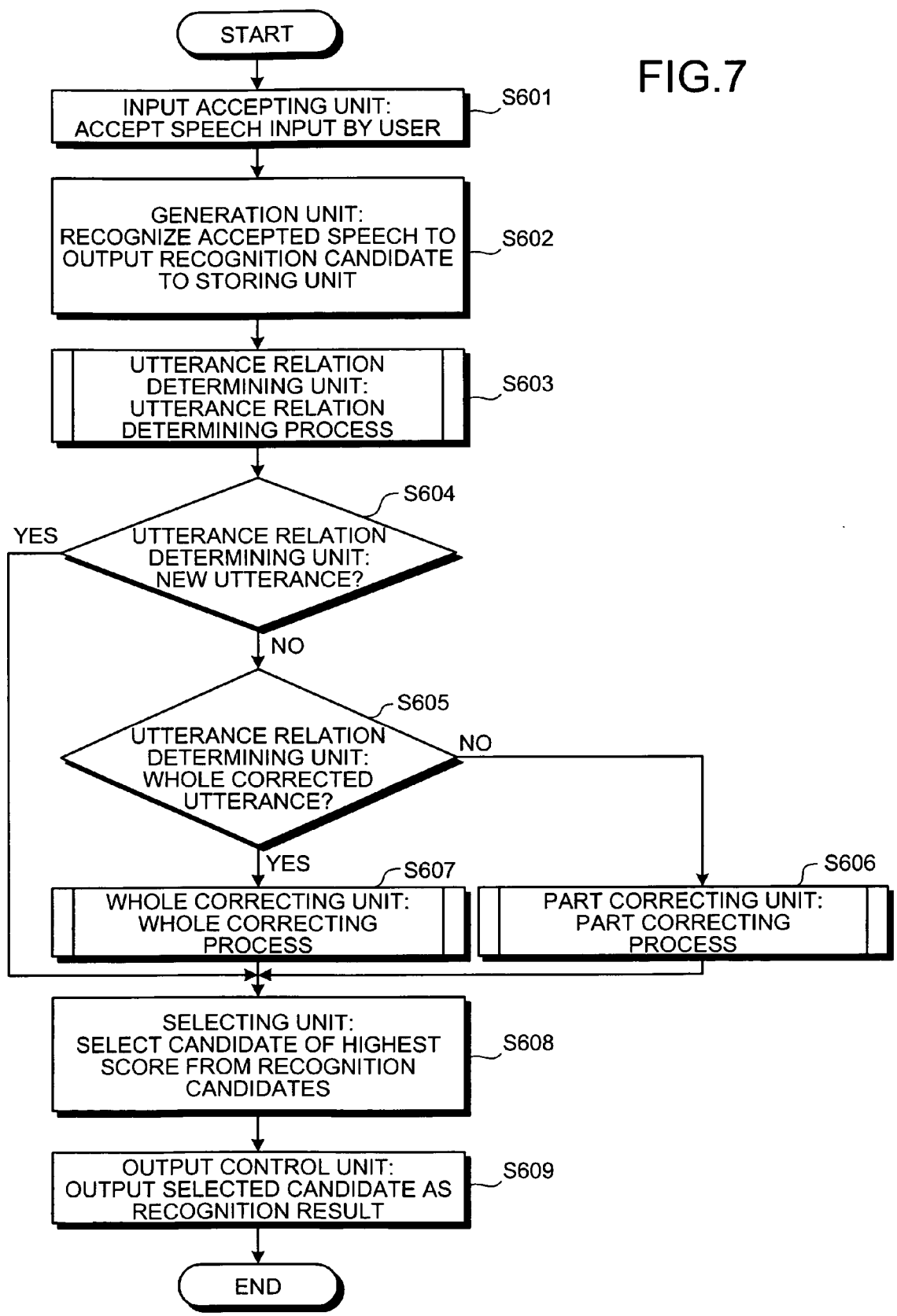
FIG. 7 is a flowchart of an entire flow of a speech recognition process according to the first embodiment.

The speech recognition process performed by the speech recognition apparatus 100 according to the first embodiment constructed as described above will be described below. FIG. 7 is a flowchart of an entire flow of the speech recognition process according to the first embodiment.

The input accepting unit 101 accepts a speech input by the user through the microphone 111 (step S601). The generation unit 102 performs the speech recognition on the accepted speech input and generates a recognition candidate to output to the storing unit 121 (step S602).

More specifically, the generation unit 102 performs frequency analysis on the speech input by a method such as FFT to output feature information. The generation unit 102 collates the feature information with a speech analysis pattern to calculate the score representing the degree of similarity and outputs the recognition candidate in the lattice format.

The utterance relation determining unit 103 performs an utterance relation determining process by comparing the immediately prior utterance with the present utterance to determine the relation between the immediately prior utterance and the present utterance (step S603). The details of the utterance relation determining process will be described later.

After the utterance relation determining process, the utterance relation determining unit 103 determines whether the present utterance is the new utterance or not (step S604). When the present utterance is not determined to be the new utterance (No in step S604), the utterance relation determining unit 103 determines whether the present utterance is the whole corrected utterance or not (step S605).

When it is determined that the present utterance is the whole corrected utterance (Yes in step S605), the whole correcting unit 104a executes the whole correcting process (step S607). When it is determined that the present utterance is not the whole corrected utterance (No in step S605), in other words, when the present utterance is the part corrected utterance, the part correcting unit 104b executes the part correcting process (step S606). The details of the whole correcting process and the part correcting process will be described later.

When it is determined in step S604 that the present utterance is the new utterance (Yes in step S604), after the execution of the whole correcting process (step S607) or after the execution of the partially correcting process (step S606), the selecting unit 105 selects a candidate having the maximum score from the recognition candidates stored in the storing unit 121 for the present utterance (step S608).

For example, when the recognition candidates are represented by the lattice as shown in FIG. 2, an uppermost node having the maximum score, i.e., 5 is selected from among nodes in a segment of input positions 2 to 7 where three candidates are present. Similarly, an uppermost node having the maximum score, i.e., 6 is selected from among nodes in a segment of input positions 9 and 10 where three candidates are present. As a result, the selecting unit 105 selects the Japanese sentence 301 shown in FIG. 3 to which the selected nodes are connected as the recognition candidates.

The output control unit 106 outputs the recognition candidate selected by the selecting unit 105 as a recognition result to the display 112 (step S609), thereby ending the speech recognition process.

Figure 8:
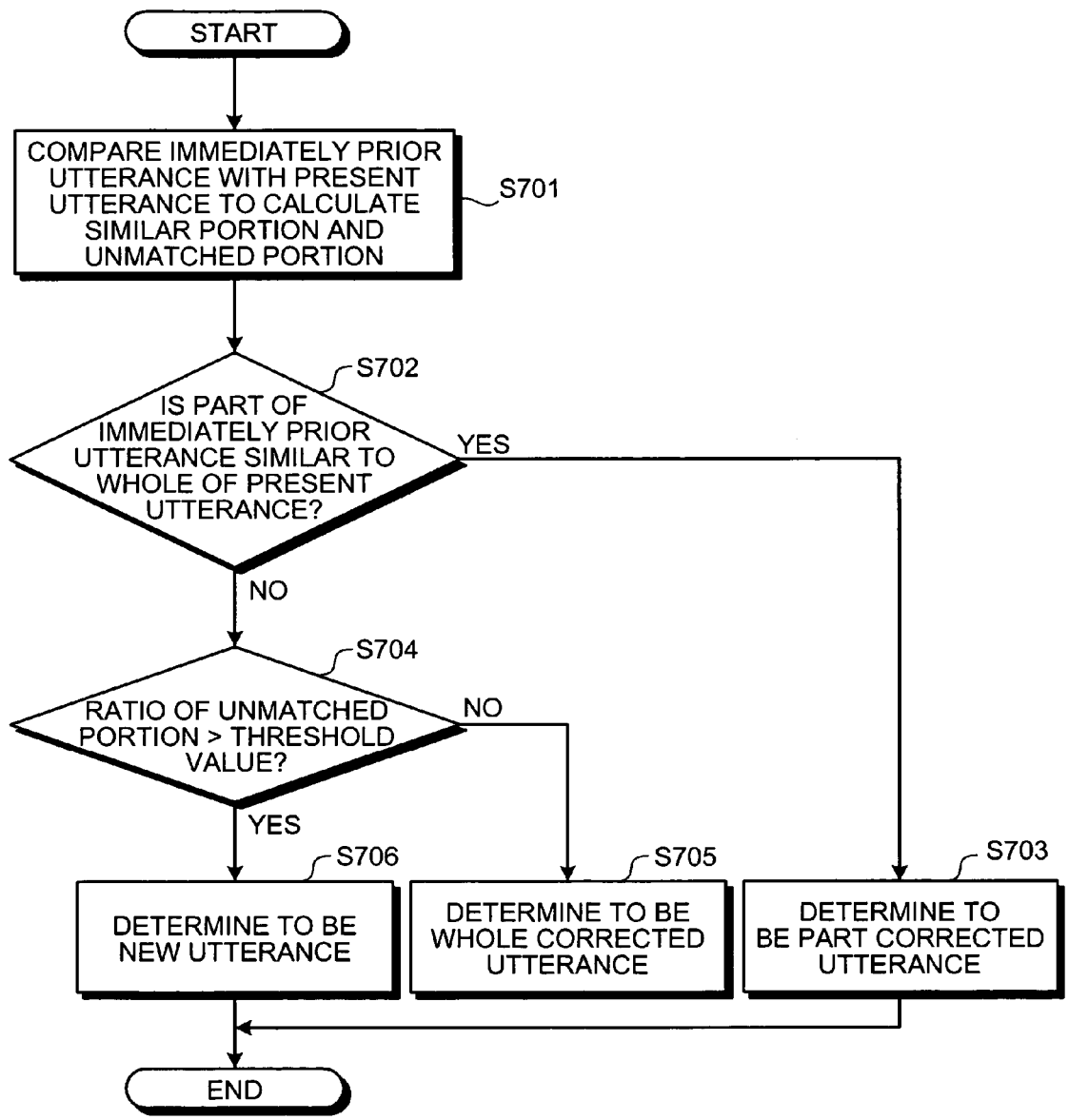
FIG. 8 is a flowchart of an entire flow of an utterance relation determining process according to the first embodiment.

The details of the utterance relation determining process shown in step S603 will be described below. FIG. 8 is a flowchart of an entire flow of the utterance relation determining process in the first embodiment.

In the utterance relation determining process, it is determined whether the present utterance is the new utterance, the whole corrected utterance, or the part corrected utterance, based on a relation between a similar portion and an unmatched portion in the immediately prior utterance and the present utterance.

The utterance relation determining unit 103 compares the immediately prior utterance and the present utterance with each other to calculate the similar portion and the unmatched portion (step S701).

For example, a method described in JP-A No. 2003-316386 can be applied to the calculation of the similar portion. More specifically, the similar portion can be determined based on digital data which is obtained by converting two input speeches into audio signals, feature information extracted from the digital data, the degree of similarity calculated by Dynamic Programming (DP) process performed on the feature information of each recognition candidate, or the like.

When the recognition candidates for predetermined segments in two input speeches include a common phoneme string or a character string, and a ratio of such common portion is equal to or higher than a predetermined threshold value, the predetermined segment may be determined to be the similar portion. When a segment in which a ratio of the common phoneme strings or character strings is higher than the predetermined threshold value is continuously present for a predetermined period of time, the segment corresponding to the continuous period of time may be determined to be the similar portion. A segment which is not determined to be the similar portion is the unmatched portion.

The utterance relation determining unit 103 determines whether a part of the immediately prior utterance is similar to the whole of the present utterance (step S702). When the part of the immediately prior utterance is similar to the whole of the present utterance (Yes in step S702), the utterance relation determining unit 103 determines that the present utterance is the part corrected utterance (step S703).

When a part of the immediately prior utterance is not similar to the whole of the present utterance (No in step S702), the utterance relation determining unit 103 determines whether a ratio of the unmatched portion is higher than a predetermined threshold value or not (step S704). As the threshold value, for example, 15% is designated.

When the ratio of the unmatched portion is higher than the predetermined threshold value (Yes in step S704), the utterance relation determining unit 103 determines that the present utterance is the new utterance (step S706). When the ratio of the unmatched portion is not higher than the predetermined threshold value (No in step S704), the utterance relation determining unit 103 determines that the present utterance is the whole corrected utterance (step S705).

In this manner, it is determined that the present utterance is the whole corrected utterance when no unmatched portion is present. In addition, the present utterance is determined to be the whole corrected utterance when the unmatched portion is included at the ratio of, e.g., 15% or less. Thus, even when the end of the sentence is changed, the present utterance can be determined to be the whole corrected utterance. Therefore, a convenient speech recognition apparatus can be realized in consideration of the mode of use of the user.

Figure 9:
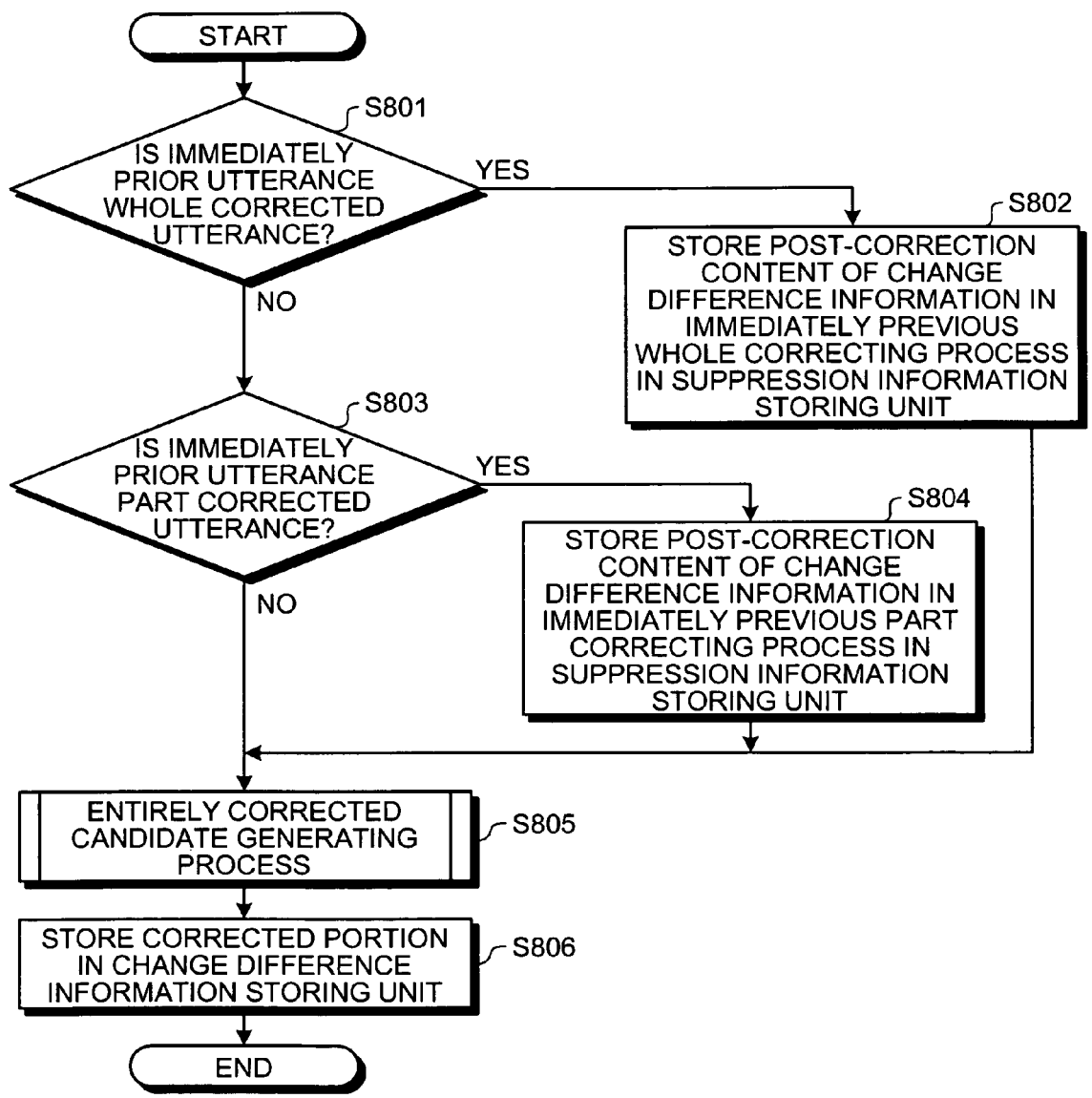
FIG. 9 is a flowchart of an entire flow of a whole correcting process according to the first embodiment.

The details of the whole correcting process shown in step S607 will be described below. FIG. 9 is a flowchart showing an entire flow of the whole correcting process in the first embodiment.

First, the whole correcting unit 104a determines whether the immediately prior utterance is the whole corrected utterance or not (step S801). The whole correcting unit 104a determines whether the immediately prior utterance is the whole corrected utterance or not with reference to information stored in the storing unit 121.

When it is determined that the immediately prior utterance is the whole corrected utterance (Yes in step S801), a post-correction content of change difference information in a whole correcting process executed for the immediately prior utterance is acquired from the change difference information storing unit 122 and stored in the suppression information storing unit 124 (step S802).

Though the whole correcting process is performed on the immediately prior utterance, the whole correcting process is performed on the present utterance again. Hence, the correction in the whole correcting process on the immediately prior utterance can be determined to be erroneous. Therefore, the post-correction content is acquired from the change difference information of the immediately prior utterance and stored in the suppression information storing unit 124 to reduce the score of a recognition candidate corresponding to the post-correction content.

When the immediately prior utterance is the new utterance, all recognition candidates selected for the immediately prior utterance may be stored in the suppression information storing unit 124. Similarly, when the immediately prior utterance is the whole corrected utterance, not only change difference information but also all the recognition candidates may be stored in the suppression information storing unit 124. The utterance may be entirely corrected because most of the recognition candidates selected for the immediately prior utterance are erroneous.

When it is not determined that the immediately prior utterance is the whole corrected utterance in step S801 (No in step S801), the whole correcting unit 104a determines whether the immediately prior utterance is the part corrected utterance or not (step S803). The whole correcting unit 104a determines whether the immediately prior utterance is the part corrected utterance or not with reference to the information stored in the storing unit 121.

When it is determined that the immediately prior utterance is the part corrected utterance (Yes in step S803), a post-correction content of change difference information in a part correcting process performed on the immediately prior utterance is acquired from the change difference information storing unit 122 and stored in the suppression information storing unit 124 (step S804).

Though the part correcting process is performed in the immediately prior utterance, the part correcting process is performed to the present utterance again. Hence, correction in the part correcting process in the immediately prior utterance can be determined to be erroneous. Therefore, the post-correction content is acquired from the change difference information of the present utterance and stored in the suppression information storing unit 124 to reduce the score of a recognition candidate corresponding to the post-correction content.

When it is not determined in step S803 that the immediately prior utterance is the part corrected utterance (No in step S803), the whole correcting unit 104a executes an entirely corrected candidate generating process for correcting the recognition candidate of the present utterance with reference to the recognition candidate for the immediately prior utterance (step S805). The details of the entirely corrected candidate generating process will be described later.

After the execution of the entirely corrected candidate generating process, the whole correcting unit 104a stores the information of the corrected portion in the change difference information storing unit 122 (step S806), thereby ending the whole correcting process.

The details of the entirely corrected candidate generating process described in step S805 will be described below. FIG. 10 is a flowchart of an entire flow of the entirely corrected candidate generating process in the first embodiment.

First, the whole correcting unit 104a acquires an latest entire utterance from the storing unit 121 to acquire an unprocessed node (to be referred to as X hereinafter) in the lattice of the latest entire utterance (step S901). The whole correcting unit 104a determines whether the same node (to be referred to as Y hereinafter) as the node X is present in the lattice of the whole corrected utterance or not (step S902).

When the same node Y as the node X is present (Yes in step S902), the whole correcting unit 104a adds the score of the input arc of the node X to the input arc of the node Y (step S904).

In this manner, not only the score of the recognition candidate calculated for the whole corrected utterance which is the present utterance but also the score of the recognition candidate calculated for the latest entire utterance are added to allow for the determination in consideration of the both, whereby a more proper recognition candidate can be selected.

When the same node Y as the node X is not present (No in step S902), the whole correcting unit 104a adds the node X and the input arc thereof to the lattice of the whole corrected utterance (step S903).

In this manner, not only the recognition candidate calculated for the whole corrected utterance which is the present utterance but also the recognition candidate calculated for the latest entire utterance are added to allow for the determination in consideration of the both, whereby a more proper recognition candidate can be selected.

The whole correcting unit 104a reflects the priority information and the suppression information on the scores of the lattice with reference to the priority information storing unit 123 and the suppression information storing unit 124 (step S905). For example, when a certain segment includes plural recognition candidates and one of the recognition candidates is a node having the same content as the content stored as the priority information, the score of the pertinent node is updated to a value obtained by adding 1 to the highest score in the segment. Further, for example, when a certain segment includes plural recognition candidates and one of the recognition candidates is a node having the same content as the content stored as the suppression information, the score of the pertinent node is updated to a value obtained by subtracting 1 from the lowest score in the segment.

The manner of reflecting the priority information and the suppression information on the scores of the lattice is not limited to the above. Any methods of increasing the score of a recognition candidate corresponding to the priority information and reducing the score of a recognition candidate corresponding to the suppression information can be applied.

The whole correcting unit 104a determines whether all the nodes in the lattice of the latest entire utterance are processed or not (step S906). When all the nodes are not processed (No in step S906), the next unprocessed node is acquired to repeat the processing (step S901). When all the nodes are processed (Yes in step S906), the entirely corrected candidate generating process is ended.

The details of the part correcting process shown in step S606 will be described below. FIG. 11 is a flowchart of an entire flow of the part correcting process in the first embodiment.

The part correcting unit 104b determines whether the immediately prior utterance is the new utterance or the whole corrected utterance with reference to the storing unit 121 (step S1001).

When the immediately prior utterance is determined to be one of the new utterance and the whole corrected utterance (Yes in step S1001), the part correcting unit 104b stores the selected recognition candidate for the immediately prior utterance by a portion corresponding to the part corrected utterance, which is the present utterance, in the suppression information storing unit 124 (step S1007).

This is because it can be determined that the user performs the part correcting process since the recognition candidate selected for the immediately prior utterance is erroneous. Therefore, the corresponding portion of the recognition candidates for the immediately prior utterance is acquired, and is stored in the suppression information storing unit 124 to reduce the score of the acquired recognition candidate.

When the immediately prior utterance is not the new utterance or the whole corrected utterance (No in step S1001), i.e., when the immediately prior utterance is the part corrected utterance, the part correcting unit 104b determines whether the input position of the immediately prior utterance and the input position of the present utterance are the same with each other (step S1002).

When the input position of the immediately prior utterance is not the same as the input position of the present utterance (No in step S1002), the part correcting unit 104b stores a post-correction content of change difference information in an immediately previous part correcting process in the priority information storing unit 123 (step S1003). The part correcting unit 104b then stores a pre-correction content of the change difference information in the immediately previous part correcting process in the suppression information storing unit 124 (step S1004).

This is because it can be determined that correction in the part correcting process of the immediately prior utterance is properly performed since the part correcting process is performed in the present utterance with respect to a portion different from a portion to which the part correcting process is executed by the immediately prior utterance. Therefore, a post-correction content is acquired from the change difference information of the immediately prior utterance, and the post-correction content is stored in the priority information storing unit 123 to increase the score of the recognition candidate corresponding to the post-correction content. A pre-correction content is acquired from the change difference information of the immediately prior utterance and stored in the suppression information storing unit 124 to reduce the score of a recognition candidate corresponding to the pre-correction content.

Further, the part correcting unit 104b stores the selected recognition candidate in the portion corresponding to the part corrected utterance, which is the present utterance, from the recognition candidates of the latest entire utterance in the suppression information storing unit 124 (step S1005).

This is because, it can be determined that though the part correcting process by the part corrected utterance which is the immediately prior utterance is properly performed, a recognition candidate in another portion selected for the latest entire utterance is erroneous. Hence it can be determined that the user performs the part correcting process to the other portion. Therefore, the recognition candidate of the portion of the latest entire utterance is acquired and stored in the suppression information storing unit 124 to reduce the score of the acquired recognition candidate.

When the input position of the immediately prior utterance is equal to the input position of the present utterance (Yes in step S1002), the part correcting unit 104b stores a post-correction content of change difference information in an immediately previous part correcting process in the suppression information storing unit 124 (step S1006).

This is because, since the part correcting process is performed by the present utterance to the same portion as that to which the part correcting process is performed by the immediately prior utterance, it can be determined that correction in the part correcting process of the immediately prior utterance is erroneous. Therefore, a post-correction content is acquired from the change difference information of the immediately prior utterance and stored in the suppression information storing unit 124 to reduce the score of the recognition candidate corresponding to the post-correction content.

After execution of step S1005, step S1006, or step S1007, the part correcting unit 104b replaces a corresponding portion in the lattice of the latest entire utterance with the recognition candidate of the part corrected utterance which is the present utterance (step S1008).

The node of the corresponding portion of the lattice of the latest entire utterance and a node representing the recognition candidate of the part corrected utterance may be integrated with each other. In this case, scores of the nodes of common recognition candidates are added. In this manner, the scores calculated for the latest entire utterance in addition to the score of the present utterance can be taken into consideration, to allow for the determination in view of the both, whereby a more proper recognition candidate can be selected.

The part correcting unit 104b reflects the priority information and the suppression information on the scores of the lattice with reference to the priority information storing unit 123 and the suppression information storing unit 124 (step S1009).

The part correcting unit 104b stores information of a corrected portion in the change difference information storing unit 122 (step S1010), and ends the part correcting process.

Figure 12A:
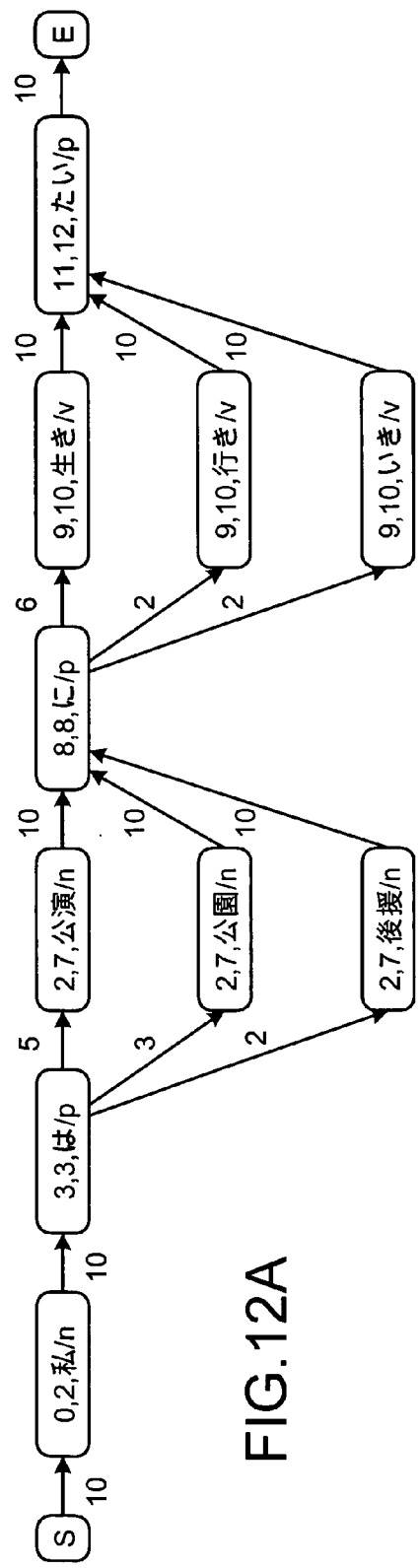
FIGS. 12A and 12B show an example of data processed by the speech recognition process.
Figure 12B:
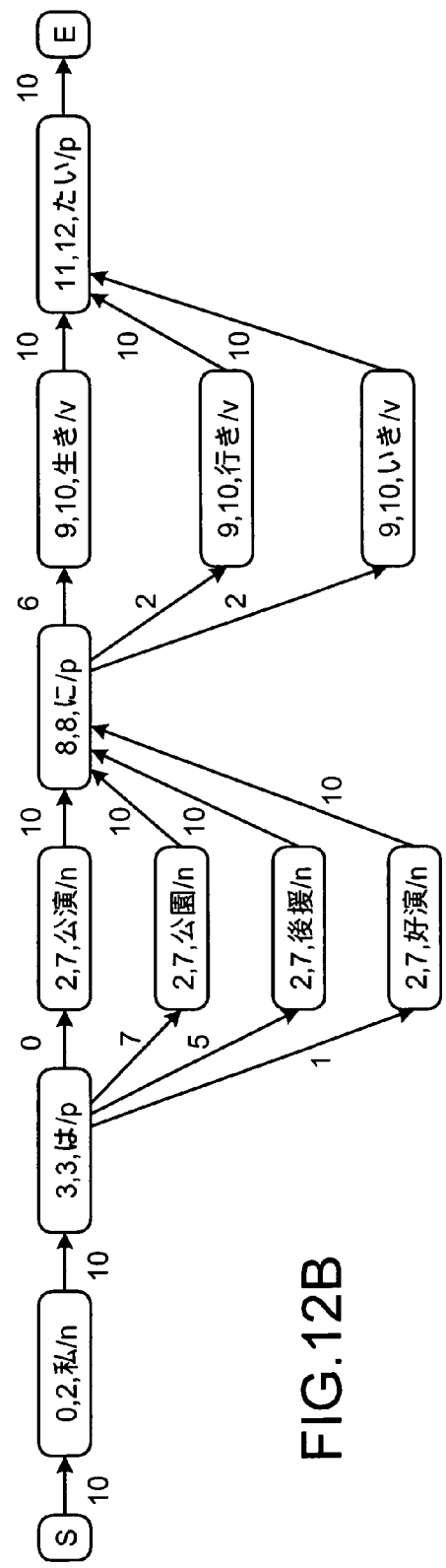

A specific example of the speech recognition process executed according to the procedures described above will be described below. FIGS. 12A and 12B show an example of data processed by the speech recognition process.

First, assume that a Japanese sentence which means "I want to go to the park" and which is pronounced as "WA-TA-SHI-WA-KO-U-EN-NI-I-KI-TA-I" is input as the new utterance (step S601) and that the generation unit 102 outputs a lattice as shown in FIG. 12A as a recognition candidate (step S602).

FIG. 12A shows an example in which three recognition candidates are present at nodes in a segment of the input positions 2 to 7, and three recognition candidates are also present at nodes in a segment of the input positions 9 and 10. The scores of the nodes are 5, 3, and 1, and 6, 2, and 2, respectively.

Thereafter, the selecting unit 105 selects nodes having the maximum score, and selects the Japanese sentence 301 in FIG. 3 to which the selected nodes are connected as a recognition candidate (step S608). The selected recognition candidate is displayed on the display 112 by the output control unit 106 (step S609).

Since the displayed recognition candidate is erroneous, the user inputs a Japanese word which means "park" and which is pronounced as "KO-U-EN" again (step S601).

Assume that, in response to the input, the generation unit 102 outputs four Japanese words 302, 303, 304, and 305 shown in FIG. 3 (step S602) as the recognition candidates for the input utterance pronounced as "KO-U-EN". The scores of four recognition candidates are 7, 7, 5, and 1, respectively.

The utterance relation determining unit 103 determines that the re-input utterance is the part corrected utterance (step S603), and the part correcting process by the part correcting unit 104b is executed (step S606).

In the part correcting process, since the immediately prior utterance is the new utterance (Yes in step S1001), a recognition candidate having a score of 5 and corresponding to the word 302 selected by the immediately prior utterance is stored in the suppression information storing unit 124 (step S1007).

A corresponding portion of the lattice of the latest entire utterance is replaced with the recognition candidate of the part corrected utterance (step S1008), and the content of the suppression information stored in the suppression information storing unit 124 is reflected (step S1009). In this case, since a recognition candidate corresponding to the word 302 is stored as the suppression information, the score of the node corresponding to the recognition candidate is set at 0 which is a value obtained by subtracting 1 from the lowest score of 1 in the four recognition candidates.

The lattice in FIG. 12B shows the state at this time. As a result, the selecting unit 105 selects a node having the highest score, and selects a Japanese word 306 in FIG. 3 to which the selected node is connected as a recognition candidate (step S608).

Similarly, the user inputs a Japanese word which means "want to go" and which is pronounced as "I-KI-TA-I" again (step S601). In this case, since the immediately prior utterance is the part corrected utterance (No in step S1001), it is then determined whether the input positions are equal to each other (step S1002).

In this example, since the input positions are not equal to each other (No in step S1002), priority information having a position of 2 and the word 303 as a content is stored in the priority information storing unit 123 with reference to change difference information in an immediately previous part correcting process (step S1003). In this manner, in the subsequent processes, the score of the word 303 can be increased.

Suppression information having a position of 2 and the word 302 as a content is stored in the suppression information storing unit 124 (step S1004). In this manner, in the subsequent processes, the score of the word 302 can be reduced.

Further, in order to suppress a recognition candidate corresponding to the re-input portion in the latest entire utterance, suppression information having a position of 9 and a word 307 as a content is stored in the suppression information storing unit 124 (step S1005). In this manner, in the subsequent processes, the score of the word 307 can be reduced.

As a result, the selecting unit 105 selects a node having the highest score, and selects a Japanese sentence 308 to which the selected node is connected as a recognition candidate (step S608). When the user determines that the selected recognition candidate is a correct recognition candidate, e.g., when the user clicks an OK button, the speech recognition process is ended.

Another specific example of the speech recognition process will be described below. FIGS. 13A to 13C show another example of data processed by the speech recognition process. FIGS. 12A and 12B show an example of data processed by the part correcting process. On the other hand, FIGS. 13A to 13C show an example of data processed by the whole correcting process.

First, assume that a Japanese sentence which means "Where should I go to see the movie?" and which is pronounced as "EI-GA-WO-MI-TA-I-NO-DE-SU-GA-DO-KO-E-I-KE-BA-YO-I-DE-SU-KA" is input as the new utterance (step S601). Further, assume that the generation unit 102 outputs a lattice shown in FIG. 13A as a recognition candidate (step S602). In FIG. 13A, nodes in a segment of input positions 8 to 15 are not shown.

Then, the selecting unit 105 selects a node having the highest score and selects a Japanese word 309 to which the selected node is connected (step S608). The selected recognition candidate is displayed on the display 112 by the output control unit 106 (step S609).

Assume that the displayed recognition candidate is erroneous, and that the user inputs a sentence pronounced as "EI-GA-WO-MI-TA-I-NO-DE-SU-GA-DO-KO-E-I-KE-BA-YO-I-I-KA" again (step S601). Further, assume that the generation unit 102 outputs a lattice shown in FIG. 13B (step S602).

The utterance relation determining unit 103 compares the immediately prior utterance with the whole corrected utterance which is the present utterance to calculate a similar portion (step S701). The lattice shown in FIG. 13A is different from the lattice shown in FIG. 13B only in expressions of the ends of the sentences. Hence, segments of input positions 0 to 18 are the similar portions.

A ratio of the unmatched portion is about 14% (=(22−19)× 100/22). When the threshold value is set at 15%, the ratio of the unmatched portion is lower than the threshold value. For this reason, the utterance relation determining unit 103 determines that the re-input utterance is the whole corrected utterance. (No in step S704, step S705). Therefore, the whole correcting process is performed by the whole correcting unit 104a (step S607).

In the whole correcting process, a lattice (FIG. 13C) obtained as an integration of the lattice (FIG. 13A) of the new utterance which is the immediately prior utterance and the lattice of the whole corrected utterance (FIG. 13B) is output (step S805).

For example, for a node 1201 corresponding to a segment of input positions 4 to 6 in FIG. 13A, a node 1202 with the same content is present in FIG. 13B (Yes in step S902). Then a score of 10 of the node 1201 and a score of 10 of the node 1202 are added to provide a value of 20 as a score of a node 1203 in FIG. 13C (step S904).

For example, a node corresponding to a node 1204 in a segment of input positions 0 to 3 in FIG. 13A is not present in the FIG. 13B (No in step S902). Hence, such node is added to the lattice in FIG. 13B, as to output the lattice of FIG. 13C with a node 1205 (step S903).

By using the lattice of FIG. 13C integrated as described above as a target, the selecting unit 105 selects a node having the highest score and selects a Japanese word 310 to which the selected node is connected as a recognition candidate (step S608).

A screen presented to the user in the speech recognition process will be described below by way of example. FIG. 14 shows an example of an operation screen displayed in the speech recognition process.

The center portion of FIG. 14 shows examples of the display on the operation screen and transitions thereof. The left portion of FIG. 14 shows examples of the operation performed by the user. The right portion of FIG. 14 indicates examples of the operation state of the speech recognition apparatus 100.

A screen 1301 is an initial screen in the speech recognition process, and includes a fixed result display region 1302 in an upper side of the screen and a recognition result display region 1303 in a lower side of the screen. A result of the speech recognition is displayed on the recognition result display region 1303 by the output control unit 106. The operation state 1304 at this time is the initial state.

Assume that the user inputs a Japanese sentence which means "Where should I go to see the movie?" In the initial state, the user inputs a speech 1305 in Japanese which means "I want to see the movie" and which is pronounced as "E-I-GA-WO-MI-TA-I-NO-DE-SU-GA".

In response to the input, a Japanese sentence 1306 is displayed as a recognition result in the recognition result display region 1303 on the screen. At this time, the operation state shifts to the correction waiting state, and the user can input a corrected utterance or a next new utterance.

The recognition result is a correct recognition result except that a word 311 must be a word 312. Hence, the user inputs a speech 1307 ("E-I-GA") corresponding to the word 312. In this case, the utterance relation determining unit 103 determines that the utterance is the part corrected utterance, and the part correcting unit 104b performs the part correcting process.

When the part correcting process is properly carried out, a Japanese sentence 1308 is displayed in the recognition result display region 1303 as a correct recognition result.

Subsequently, the user inputs a speech 1309 in Japanese which means "Where should I go?" and which is pronounced as "DO-KO-E-I-KE-BA-YO-I-DE-SHO-U-KA".

The utterance relation determining unit 103 compares the utterance with an immediately prior utterance thereby determining that the utterance is the new utterance, fixes the recognition result of the immediately prior utterance, and displays the recognition result in the fixed result display region 1302. The utterance relation determining unit 103 performs the speech recognition of the input speech to display a Japanese sentence 1310 as a recognition result.

In this case, since the error in the Japanese sentence 1310 is like a burst error, the user inputs a speech 1311 in Japanese which is the same as the speech 1309 again. In this case, the utterance relation determining unit 103 determines that the utterance is the whole corrected utterance. Then, the whole correcting unit 104 performs the whole correcting process.

When the whole correcting process is correctly performed, a Japanese sentence 1312 is displayed in the recognition result display region 1303 as a correct recognition result.

Since the whole speech input is correctly recognized, the user pushes down the OK button. Then, the output control unit 106 re-displays a screen 1313 on which the recognition result displayed in the recognition result display region 1303 is moved into the fixed result display region 1302.

In this manner, the user can check the result of the speech recognition, and appropriately select the part correcting process or the whole correcting process by inputting a speech. More specifically, re-inputting can be performed based on easily understandable standards, i.e., the partial re-input is performed when there is a little error, and the whole re-input is performed when there are many errors. In addition, since an operation or the like is not required to switch from the part correcting process to the whole correcting process, and vice versa, an operation of the correcting process can be smoothly performed.

Further, the user can perform the input and the correction of the sentence only by the speech input except for the depression of the OK button at the confirmation of the recognition result. Thus the speech recognition apparatus of the first embodiment can provide a high operability and convenience for the user.

As described above, in the speech recognition apparatus according to the first embodiment, it can be determined whether a re-input speech provided by the user is for the whole correcting process or for the part correcting process, and the manner of correction can be changed according to the result of determination. Therefore, the user does not need to give an instruction on the manner of correction, and an optimal manner of correction can be employed according to the manner of speech input. Thus, the result of speech recognition provided as an output is highly useful for the user and highly accurate.

Further, since the most likely recognition candidate can be selected from the recognition candidates obtained as the integration of the recognition candidates of the original speech and the recognition candidates of the speech input for the correction, the speech recognition apparatus does not mistakenly replace the correct recognition result of the original speech with the erroneous content obtained via erroneous recognition and output the erroneous content. Thus, a highly precise recognition result can be obtained.

A speech recognition apparatus according to a second embodiment, when the unmatched portion is included in the recognition result of the original speech and the recognition result of the speech input for the correction, and when a combination of recognition results including unmatched portions having a predetermined relation is present, outputs the combination of recognition results as a recognition candidate.

FIG. 15 is a block diagram of the configuration of a speech recognition apparatus 1400 according to the second embodiment. As shown in FIG. 15, the speech recognition apparatus 1400 includes, as a main hardware configuration, a microphone 111, a display 112, a speaker 113, a storing unit 121, a change difference information storing unit 122, a priority information storing unit 123, and a suppression information storing unit 124, and a thesaurus storing unit 1425.

The speech recognition apparatus 1400 also includes, as a main software configuration, an input accepting unit 101, a generation unit 102, an utterance relation determining unit 1403, a correcting unit 104, a selecting unit 105, and an output control unit 106.

The second embodiment is different from the first embodiment in the addition of the thesaurus storing unit 1425 and the function of the utterance relation determining unit 1403. Since the other configurations and functions are the same as those of the speech recognition apparatus 100 according to the first embodiment shown in FIG. 1, the same elements are denoted by the same reference characters and the description thereof will not be repeated.

The thesaurus storing unit 1425 serves to store a thesaurus in which words are associated with synonyms corresponding thereto. FIG. 16 shows an example of a data structure of the thesaurus stored in the thesaurus storing unit 1425.

As shown in FIG. 16, the thesaurus storing unit 1425 stores words and the synonyms of the words in association with each other. FIG. 16 shows an example where a Japanese word 1601 which means a movie and a Japanese word 1602 which represents the pronunciation of the English word "movie" in Kata-kana which is one of Japanese phonograms are associated with each other.

Similarly to the utterance relation determining unit 103 according to the first embodiment, the utterance relation determining unit 1403 serves to determine whether the present utterance input by the user for the immediately prior utterance is a re-utterance of the whole of the immediately prior utterance or a re-utterance of the part of the immediately prior utterance.

In addition, the utterance relation determining unit 1403 is different from the utterance relation determining unit 103 according to the first embodiment in that the utterance relation determining unit 1403 determines whether the present utterance input by the user for the immediately prior utterance is a re-utterance of the immediately prior utterance with a part thereof being replaced with a synonym thereof.

More specifically, the utterance relation determining unit 1403 determines that the present utterance is a re-utterance of the whole of the immediately prior utterance and not the new utterance when the immediately prior utterance and the present utterance include unmatched portions whose recognition results have a relation of synonyms. Such utterance which is a re-utterance of the whole of the prior utterance and which includes a synonym of a part of the prior utterance in the unmatched portion will be referred to as a partially paraphrased entire utterance hereinafter.

A relation between the recognition result of the immediately prior utterance and the recognition result of the present utterance is not limited to the relation of synonyms. It can be determined whether the recognition results can be translated into the same word in another language (hereinafter referred to as a relation of same translation) or whether they conceptually have a hierarchically upper-lower relation (hereinafter referred to as a relation of hierarchical concepts).

For example, the word 312 and the word 313 can be translated into the same English word "movie." Thus, the words 312 and 313 have the relation of same translation. Further, for example, the word 314 and the word 315 represent concepts having an upper-lower relation with each other. Such relation is called the relation of hierarchical concepts hereinbelow. In these cases, a translation dictionary or a thesaurus dictionary may be stored as a dictionary corresponding to the thesaurus storing unit 1425.

Figure 17:
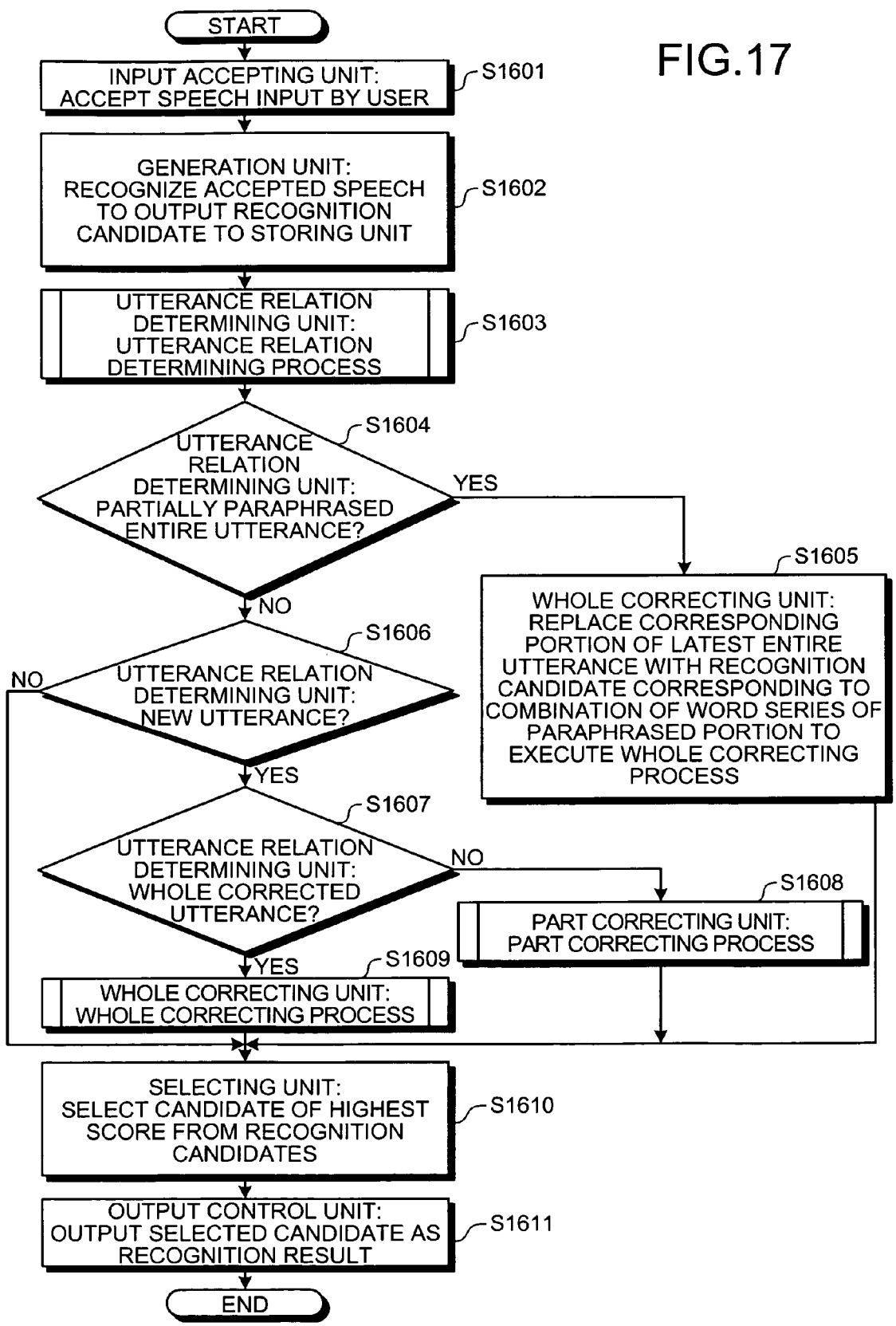
FIG. 17 is a flowchart of an entire flow of a speech recognition process according to the second embodiment.

A speech recognition process by the speech recognition apparatus 1400 according to the second embodiment configured as described above will be described below. FIG. 17 is a flowchart of an entire flow of the speech recognition process according to the second embodiment.

Since a speech input accepting process in step S1601 and a speech recognition process in step S1602 are the same as processes in step S601 and step S602 in the speech recognition apparatus 100 according to the first embodiment, a description thereof will not be repeated.

In an utterance relation determining process in step S1603, the utterance relation determining unit 1403 executes the utterance relation determining process by comparing the immediately prior utterance with the present utterance and determining whether the present utterance is the new utterance, the whole corrected utterance, the part corrected utterance, or the partially paraphrased entire utterance. The details of the utterance relation determining process will be described later.

After the utterance relation determining process, the utterance relation determining unit 1403 determines whether the present utterance is the partially paraphrased entire utterance or not (step S1604). When the present speech is determined to be the partially paraphrased entire utterance (Yes in step S1604), the whole correcting unit 104a performs the whole correcting process by replacing a portion corresponding to the paraphrased portion in the lattice of the immediately prior utterance with a recognition candidate of a combination of word series in the paraphrased portion (step S1605).

The combination of word series of the paraphrased portion is acquired in the utterance relation determining process. More specifically, when a recognition result of the immediately prior utterance and a recognition result of the present utterance are determined to have a relation of synonyms, and the present utterance is determined to be the partially paraphrased entire utterance in the utterance relation determining process, a combination of recognition results having the relation of synonyms is acquired as the combination of word series of the paraphrased portion.

For example, assume that a word 311 and a word 312 are provided as the recognition candidates of the immediately prior utterance and that a word 313 and a word 315 are provided as the recognition candidates of the present utterance. In this case, since the word 312 in the immediately prior utterance and the word 313 in the present utterance have a relation of synonyms, the present utterance is determined to be the partially paraphrased entire utterance. At the same time, a combination of the word 312 and the word 313 is acquired as a combination of word series of the paraphrased portion.

The whole correcting process in step S1605 is the same as the whole correcting process described in the first embodiment except that the lattice of the latest entire utterance is replaced with the recognition candidate corresponding to the word series of the paraphrased portion. Therefore, a description thereof will not be repeated.

Since a whole correcting process, a part correcting process, a recognition candidate selecting process, and a recognition result output process in steps S1606 to S1611 are the same as the processes in steps S604 to S609, the description thereof will not be repeated.

Figure 18:
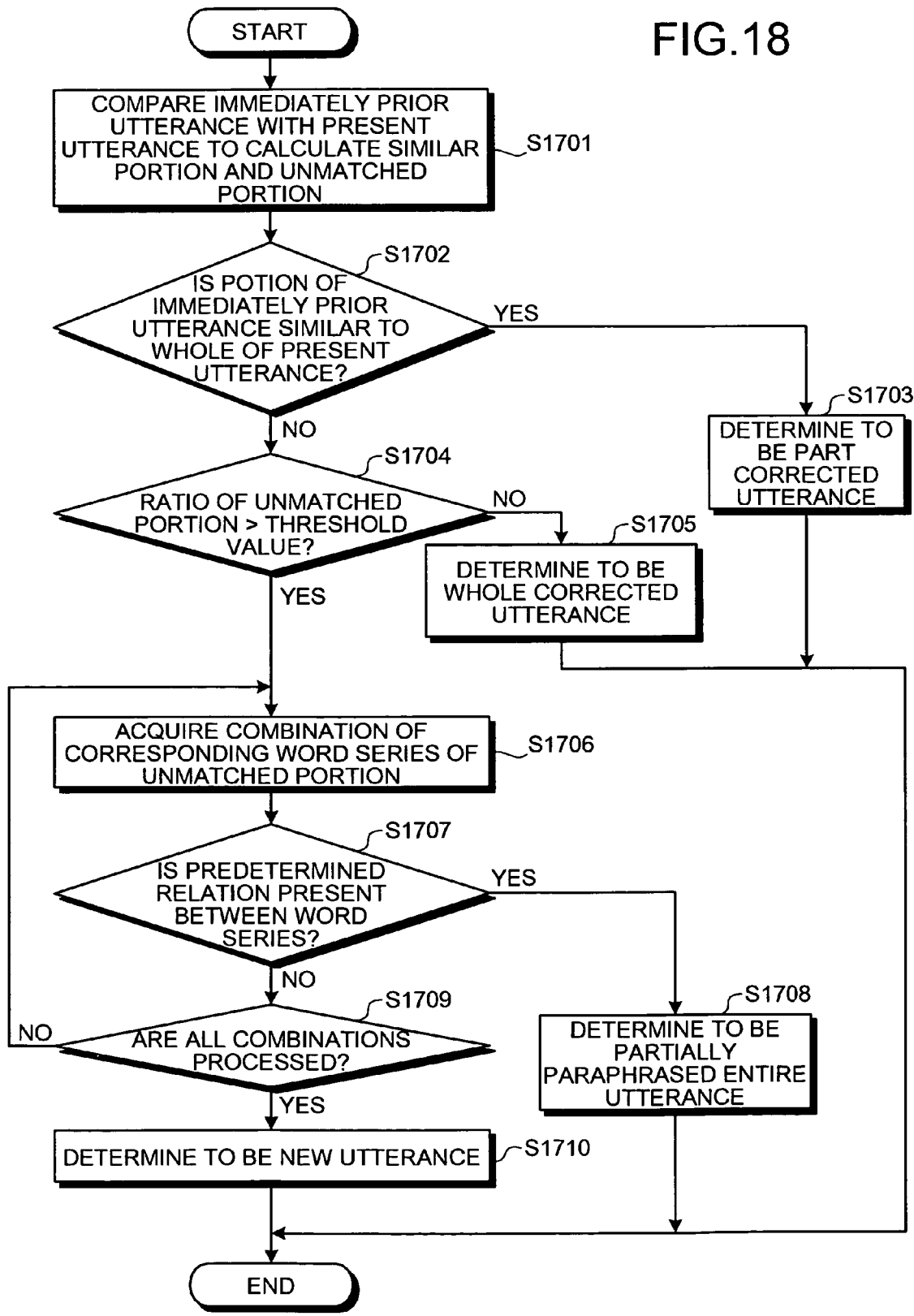
FIG. 18 is a flowchart of an entire flow of an utterance relation determining process according to the second embodiment.

The details of the utterance relation determining process shown in step S1603 will be described below. FIG. 18 is a flowchart of an entire flow of the utterance relation determining process in the second embodiment.

Since a similar portion calculating process, a part corrected utterance determining process, and a whole corrected utterance determining process in steps S1701 to S1705 are the same as those in steps S701 to S705, a description thereof will not be repeated.

The second embodiment is different from the first embodiment in that when it is determined that a ratio of an unmatched portion is higher than a predetermined threshold value, the utterance is not simply determined as the new utterance, but the utterance may be determined to be the partially paraphrased entire utterance in consideration of a relation between the recognition results in the unmatched portion.

More specifically, when it is determined in step S1704 that the ratio of the unmatched portion is higher than the predetermined threshold value (Yes in step S1704), the utterance relation determining unit 1403 acquires a combination of word series corresponding to the unmatched portion (step S1706).

For example, assume that the word 311 and the word 312 are provided as recognition candidates of the immediately prior utterance, that the word 313 and a word 316 are provided as recognition candidates of the present utterance, and that this portion is determined to be the unmatched portion. In this case, as combinations of corresponding word series, four combinations exist, i.e., a combination of the word 311 and the word 313, a combination of the word 311 and the word 316, a combination of the word 312 and the word 313, and a combination of the word 312 and the word 316. In step S1706, the utterance relation determining unit 1403 acquires one of the four combinations.

Here, the utterance relation determining unit 1403 may preferentially acquire a combination which does not include the recognition candidate selected for the immediately prior utterance. Since the recognition candidate selected in the immediately prior utterance is likely to be erroneous, the determining process excluding such recognition candidate brings about a more efficient processing.

The utterance relation determining unit 1403 determines whether the word series included in the acquired combination have a predetermined relation or not (step S1707). The predetermined relation includes, as described above, a relation of synonyms, a relation of the same translation, relation of hierarchical concept, and the like.

When the word series have the predetermined relation (Yes in step S1707) the utterance relation determining unit 1403 determines that the present utterance is a partially paraphrased entire utterance (step S1708), and ends the utterance relation determining process. In this case, the combination of the word series having the predetermined relation is stored in a storing unit such as a RAM (not shown). The combination is to be referred to in the whole correcting process in step S1605.

In the above example, the combination of word series determined to have the predetermined relation at first is stored as a correct combination. However, it may be determined whether each of all the combinations has the predetermined relation or not, and an optimum combination may be calculated based on the likelihood of the predetermined relation, the degrees of acoustic similarity of the word series, or the like.

When the combination does not have the predetermined relation (No in step S1707), the utterance relation determining unit 1403 determines whether all the combinations of word series are processed or not (step S1709). When the utterance relation determining unit 1403 determines that all the combinations of word series are not processed (No in step S1709), a combination of unprocessed word series is acquired, and the process is repeated (step S1706).

On the other hand, on determining that all the nodes are processed (Yes in step S1709), the utterance relation determining unit 1403 determines that the present utterance is a new utterance (step S1710) and ends the utterance relation determining process.

A specific example of the speech recognition process executed according to the above procedures will be described below. FIGS. 19A and 19B show an example of data processed in the speech recognition process.

First, assume that a Japanese sentence which means "I want to see the movie" and which is pronounced as "EI-GA-WO-MI-TA-I-NO-DE-SU-GA" is input as the new utterance (step S1601) and that the generation unit 102 outputs a lattice shown in FIG. 19A as a recognition candidate (step S1602).

Then, the selecting unit 105 selects a node having the highest score and selects a Japanese sentence 317 to which the selected node is connected as a recognition candidate (step S1610). The selected recognition candidate is displayed on the display 112 by the output control unit 106 (step S1611).

Assume that the displayed recognition candidate is erroneous, and the user re-inputs a Japanese sentence which is pronounced as "MU-U-BI-I-WO-MI-TA-I-NO-DE-SU-GA" and which is obtained by replacing the word 312 in the first input sentence with the word 313, which is a synonym of the word 312 (step S1601).

The generation unit 102 outputs a lattice as shown in FIG. 19B as a recognition candidate (step S1602).

In this case, the utterance relation determining unit 1403 calculates a segment starting from an input position 4 as the similar portion and a segment of input positions 0 to 3 as the unmatched portion (step S1701). A ratio of the unmatched portion is about 33% (=(12−8)×100/12)). When a threshold value is set at 15%, the ratio of the unmatched portion is higher than the threshold value (Yes in step S1706), and the utterance relation determining unit 1403 acquires a combination of word series corresponding to the unmatched portion (step S1706).

For example, assume that the utterance relation determining unit 1403 acquires a combination of the word 312 and the word 316 (step S1706). In this case, since the relation of synonyms between the two words is not stored in the thesaurus storing unit 1425, the utterance relation determining unit 1403 determines that the two words do not have a predetermined relation (No in step S1707).

Assume that the utterance relation determining unit 1403 acquires a combination of the word 312 and the word 313 (step S1706). In this case, since the relation of synonyms between the two words is stored in the thesaurus storing unit 1425, the utterance relation determining unit 1403 determines that the two words have the predetermined relation (Yes in step S1707). Therefore, the utterance relation determining unit 1403 determines that the present utterance is the partially paraphrased entire utterance (step S1708).

The whole correcting unit 104a uses the word 312 and the word 313 as recognition results of the unmatched portions and replaces the recognition results in a segment of input positions 0 to 3 of the lattice in FIG. 19B, which is the lattice of the immediately prior utterance, with words 312 and 313 employed as the new recognition results, thereby executing the whole correcting process (step S1605).

In this manner, in the speech recognition apparatus according to the second embodiment, when the recognition result of the original speech and the recognition result of the speech input for the correction have the unmatched portion, and when there are the recognition results having a predetermined relation for the unmatched portions, such recognition results having the predetermined relation can be output as recognition candidates. Thus, the recognition candidate can be determined simultaneously with the identification of the unmatched portion, whereby an efficient speech recognition process can be realized.

The first and the second embodiments can be applied to a voice input device in a voice translating system. In the voice translating system, unlike a command-input type voice system used in an automobile navigation system or operations of home electric appliances, various contents are supposed to be supplied as a speech input. Further, an input is performed not with a fragmentary word such as a nominal phrase, but with a sentence or a phrase having a certain length.

The speech recognition process as described above may be applied to a voice dictator to implement a function of editing a recognition result. The speech recognition process of the embodiments is suitable for such system, since the voice dictator receives a long document via voice and corrects erroneous speech recognition similarly to the voice translating system. In general, the voice dictator is used in hardware such as a Personal Computer (PC), and the result of speech recognition can be edited by an input device such as a keyboard or a mouse other than a voice input device. Therefore, a function of correcting a result of speech recognition via the re-input of speech can be applied as one of editing functions.

On the other hand, the voice translating system is required to be portable, and the use of a peripheral device such as a keyboard or a mouse is not supposed. Further, the voice translating system has a small screen and is optimally operated with voice because the voice translating system is used in communication with a person.

The present invention is not limited to the above embodiments. For example, the present invention can also be applied to a voice input interface for a personal computer, an automobile navigation system, and an input interface for controlling home electric appliances.

The speech recognition program executed by the speech recognition apparatus according to the first or the second embodiment may be incorporated in a Read Only Memory (ROM) or the like in advance for provision.

The speech recognition program executed by the speech recognition apparatus according to the first or the second embodiment may be recorded on a computer readable recording medium such as a Compact Disk Read Only Memory (CD-ROM), a flexible disk (FD), a Compact disk Recordable (CD-R), or a Digital Versatile Disk (DVD) in a file of an installable format or an executable format.

Further, the speech recognition program executed by the speech recognition apparatus according to the first or the second embodiment may be stored on a computer connected to a network such as the Internet and downloaded through the network. The speech recognition program executed by the speech recognition apparatus according to the first or the second embodiment may be provided or delivered through a network such as the Internet.

The speech recognition program executed by the speech recognition apparatus according to the first or the second embodiment has a module configuration including the above described units (the input accepting unit, the generation unit, the utterance relation determining unit, the correcting unit, the recognition candidate selecting unit, and the output control unit). As actual hardware, a Central Processing Unit (CPU) reads the speech recognition program from the ROM and executes the speech recognition program to load the respective units on a main memory, so that the respective units are generated on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech recognition apparatus comprising:
   a generation unit configured to receive a speech utterance and to generate at least one recognition candidate associated with the speech utterance and a likelihood of the recognition candidate;
   a storing unit configured to store at least the one recognition candidate and the likelihood;
   a selecting unit configured to select one of at least the one recognition candidate as a recognition result of a first speech utterance based on the likelihood;
   an utterance relation determining unit configured to:
   determine that, upon detecting a similar portion in which a degree of similarity between previously-input speech information of the first speech utterance and subsequently-input speech Information of a second speech utterance is higher than a predetermined first threshold value and an unmatched portion except the similar portion in the first speech utterance and a ratio of the unmatched portion is equal to or less than a predetermined second threshold value, the second speech utterance is a speech re-utterance of a whole of the first speech utterance,
   determine that, when the similar portion matches with a part of the first speech utterance and the similar portion matches with a whole of the second speech utterance, the second speech utterance Is a speech re-utterance of the part of the first speech utterance, and to determine that, when the ratio of the unmatched portion is higher than the second threshold value, the second speech utterance is a new utterance,
   determine whether the recognition candidate for the first speech utterance and the recognition candidate for the second speech utterance have a predetermined relation in unmatched portions of the first speech utterance and the second speech utterance, and
   when the recognition candidates of the first and the second speech utterances have the predetermined relation, determine that the second speech utterance is a speech re-utterance of the whole of the first speech utterance and that in the speech re-utterance, a part of the first speech utterance is replaced with a different speech utterance; and
   a whole correcting unit configured to:
   correct the recognition candidate of the whole of the first speech utterance based on the second speech utterance and to display the corrected recognition candidate when the utterance relation determining unit determines that the second speech utterance is the speech re-utterance of the whole of the first speech utterance; and
   output the recognition candidates having the predetermined relation when the utterance relation determining unit determines that the second speech utterance is the speech re-utterance of the whole of the first speech utterance and that in the speech re-utterance, the part of the first speech utterance is replaced with the different speech utterance; and
   a part correcting unit configured to correct the recognition candidate for the part of the first speech utterance, the part corresponding to the second speech utterance, based on the second speech utterance and to display the corrected recognition candidate when the utterance relation determining unit determines that the second speech utterance is the speech re-utterance of the part of the first speech utterance.

2. The speech recognition apparatus according to claim 1, wherein the whole correcting unit integrates the recognition candidate for the first speech utterance and the recognition candidate for the second speech utterance with each other, when the recognition candidate for the first speech utterance and the recognition candidate for the second speech utterance are common, calculates a new likelihood based on the likelihood of the common recognition candidate for the first speech utterance and the likelihood of the common recognition candidate for the second speech utterance, and outputs the new likelihood to the storing unit.

3. The speech recognition apparatus according to claim 2, wherein the whole correcting unit reduces the likelihood of the recognition result corresponding to a portion in the first speech utterance, the portion being a portion at which a speech utterance immediately prior to the first speech utterance is corrected by the first speech utterance.

4. The speech recognition apparatus according to claim 1, wherein the part correcting unit, when the recognition candidate for a part of the first speech utterance and the recognition candidate for the second speech utterance are common, calculates a new likelihood based on the likelihood of the common recognition candidate for the first speech utterance and the likelihood of the common recognition candidate for the second speech utterance, the part of the first speech utterance corresponding to the speech re-utterance by the second speech utterance, and outputs the likelihood to the storing unit.

5. The speech recognition apparatus according to claim 1, wherein the part correcting unit outputs the recognition candidate to the storing unit, the recognition candidate being obtained by replacing a portion in the first speech utterance with the recognition candidate for the second speech utterance, the portion corresponding to the speech re-utterance by the second speech utterance.

6. The speech recognition apparatus according to claim 1, wherein the part correcting unit increases the likelihood of the recognition result corresponding to a portion in the first speech utterance, when the portion is not re-uttered in the second speech utterance, the portion being a portion at which a speech utterance immediately prior to the first speech utterance is corrected by the first speech utterance.

7. The speech recognition apparatus according to claim 1, wherein the part correcting unit reduces the likelihood of the recognition result corresponding to a portion in the first speech utterance, when the portion is re-uttered in the second speech utterance, the portion being a portion at which a speech utterance immediately prior to the first speech utterance is corrected by the first speech utterance.

8. The speech recognition apparatus according to claim 1, wherein the utterance relation determining unit determines whether a relation of synonyms is present as the predetermined relation or not.

9. The speech recognition apparatus according to claim 1, wherein the utterance relation determining unit determines whether a relation of the same translation is present as the predetermined relation or not.

10. The speech recognition apparatus according to claim 1, wherein the utterance relation determining unit determines whether a relation of hierarchical concept is present as the predetermined relation or not.

11. The speech recognition apparatus according to claim 1, wherein upon the determination by the utterance relation determining unit that the second speech utterance is the new speech utterance, the new speech utterance is output to the storing unit.

12. A method of speech recognition comprising steps implemented by a computer, of:
receiving a speech utterance;
generating, by the computer, at least one recognition candidate associated with the speech utterance and a likelihood of the recognition candidate;
selecting, by the computer, one of at least the one recognition candidate as a recognition result of a first speech utterance based on the likelihood;
determining, by the computer, that upon detecting a similar portion in which a degree of similarity between previously-input speech information of the first speech utterance and subsequently-input speech information of a second speech utterance is higher than a predetermined first threshold value and an unmatched portion except the similar portion in the first speech utterance and a ratio of the unmatched portion is equal to or less than a predetermined second threshold value, the second speech utterance is a speech re-utterance of a whole of the first speech utterance;
determining, by the computer, that when the similar portion matches with a part of the first speech utterance and the similar portion matches with a whole of the second speech utterance, the second speech utterance is a speech re-utterance of the part of the first speech utterance;
determining, by the computer, that when the ratio of the unmatched portion is higher than the second threshold value, the second speech utterance is a new utterance;
determining, by the computer, whether the recognition candidate for the first speech utterance and the recognition candidate for the second speech utterance have a predetermined relation in unmatched portions of the first speech utterance and the second speech utterance;
when the recognition candidates of the first and the second speech utterances have the predetermined relation, determining that the second speech utterance is a speech re-utterance of the whole of the first speech utterance and that in the speech re-utterance, a part of the first speech utterance is replaced with a different speech utterance;
correcting, by the computer, the recognition candidate of the whole of the first speech utterance based on the second speech utterance to display the corrected recognition candidate, when the second speech utterance is determined to be the speech re-utterance of the whole of the first speech utterance;
correcting, by the computer, the recognition candidate for the part of the first speech utterance, the part corresponding to the second speech utterance, based on the second speech utterance to display the corrected recognition candidate, when the second speech utterance is determined to be the speech re-utterance of the part of the first speech utterance; and
outputting, by the computer, the recognition candidates having the predetermined relation, when the second speech utterance is determined to be the speech re-utterance of the whole of the first speech utterance, for which, in the speech re-utterance, the part of the first speech utterance is replaced with the different speech utterance.

13. A non-transitory computer program product having a computer readable medium including programmed instructions for performing a speech recognition process, wherein the instructions, when executed by a computer, cause the computer to perform:
receiving a speech utterance;
generating at least one recognition candidate associated with the speech utterance and a likelihood of the recognition candidate;
selecting one of at least the one recognition candidate as a recognition result of a first speech utterance based on the likelihood;
determining that, upon detecting a similar portion in which a degree of similarity between previously-input speech information of the first speech utterance and subsequently-input speech information of a second speech utterance is higher than a predetermined first threshold value and an unmatched portion except the similar portion in the first speech utterance and a ratio of the unmatched portion is equal to or less than a predetermined second threshold value, the second speech utterance is a speech re-utterance of a whole of the first speech utterance;
determining that, when the similar portion matches with a part of the first speech utterance and the similar portion matches with a whole of the second speech utterance, the second speech utterance is a speech re-utterance of the part of the first speech utterance;

determining that, when the ratio of the unmatched portion is higher than the second threshold value, the second speech utterance is a new utterance;

determining whether the recognition candidate for the first speech utterance and the recognition candidate for the second speech utterance have a predetermined relation in unmatched portions of the first speech utterance and the second speech utterance;

when the recognition candidates of the first and the second speech utterances have the predetermined relation, determining that the second speech utterance is a speech re-utterance of the whole of the first speech utterance and that in the speech re-utterance, a part of the first speech utterance is replaced with a different speech utterance;

correcting the recognition candidate of the whole of the first speech utterance based on the second speech utterance to display the corrected recognition candidate, when the second speech utterance is determined to be the speech re-utterance of the whole of the first speech utterance;

correcting the recognition candidate for the part of the first speech utterance, the part corresponding to the second speech utterance, based on the second speech utterance to display the corrected recognition candidate, when the second speech utterance is determined to be the speech re-utterance of the part of the first speech utterance; and outputting the recognition candidates having the predetermined relation, when the second speech utterance is determined to be the speech re-utterance of the whole of the first speech utterance, for which, in the speech re-utterance, the part of the first speech utterance is replaced with the different speech utterance.

* * * * *

UNITED STATES PATENT AND TRADEMARK OFFICE
CERTIFICATE OF CORRECTION

| | | |
|---|---|---|
| PATENT NO. | : 7,983,912 B2 | |
| APPLICATION NO. | : 11/374976 | |
| DATED | : July 19, 2011 | |
| INVENTOR(S) | : Hideki Hirakawa et al. | |

It is certified that error appears in the above-identified patent and that said Letters Patent is hereby corrected as shown below:

On the title page, paragraph (57), line 3, after "storing the" please delete "one".

In claim 1, col. 23, line 65, please replace "Information" with --information--.

In claim 1, col. 24, line 9, please replace "Is" with --is--.

Signed and Sealed this
Tenth Day of July, 2012

David J. Kappos
*Director of the United States Patent and Trademark Office*